United States Patent
Martucci et al.

(10) Patent No.: US 7,760,137 B2
(45) Date of Patent: *Jul. 20, 2010

(54) PORTABLE POSITION DETERMINING DEVICE

(75) Inventors: Jennifer Martucci, Muttontown, NY (US); Eugene F. Fowler, Richardson, TX (US); Joseph C. McAlexander, Murphy, TX (US)

(73) Assignee: Pfizer, Inc., New York, NY (US)

( * ) Notice: Subject to any disclaimer, the term of this patent is extended or adjusted under 35 U.S.C. 154(b) by 300 days.

This patent is subject to a terminal disclaimer.

(21) Appl. No.: 11/789,053

(22) Filed: Apr. 23, 2007

(65) Prior Publication Data

US 2008/0055154 A1    Mar. 6, 2008

Related U.S. Application Data

(63) Continuation-in-part of application No. 11/063,254, filed on Feb. 22, 2005, now Pat. No. 7,209,075, which is a continuation of application No. 10/361,802, filed on Feb. 10, 2003, now Pat. No. 6,859,171, which is a continuation of application No. 09/862,569, filed on May 22, 2001, now Pat. No. 6,518,919, which is a continuation of application No. 09/362,789, filed on Jul. 28, 1999, now Pat. No. 6,236,358.

(60) Provisional application No. 60/140,040, filed on Jun. 18, 1999.

(51) Int. Cl.
*G01S 1/00* (2006.01)
*G01S 1/02* (2006.01)

(52) U.S. Cl. .............................. 342/357.1; 342/357.06; 342/357.08; 342/357.09

(58) Field of Classification Search ............ 342/357.01, 342/357.06–357.09, 357.1, 357.13, 457, 342/463; 701/213, 215; 455/426.1, 435.1, 455/456.1

See application file for complete search history.

(56) References Cited

U.S. PATENT DOCUMENTS

| | | | |
|---|---|---|---|
| 5,982,281 A | 11/1999 | Layson, Jr. | |
| 6,518,919 B1 * | 2/2003 | Durst et al. | 342/357.07 |
| 6,859,171 B2 * | 2/2005 | Durst et al. | 342/357.1 |
| 7,209,075 B2 * | 4/2007 | Durst et al. | 342/357.1 |
| 2001/0022558 A1 | 9/2001 | Karr, Jr. et al. | |

* cited by examiner

*Primary Examiner*—Dao L Phan
(74) *Attorney, Agent, or Firm*—Scully, Scott, Murphy & Presser, P.C.

(57) ABSTRACT

A position determining device is disclosed comprising a satellite navigation receiver for automatically providing computed position information, when the device has changed its position relative to a predetermined location, to a paging transmitter for transmission to a paging receiver for readout of the computed position information. The readout may be in the form of coordinates and may be accompanied by a message or alarm. The device may be configured as a portable unit of small size and economical manufacture.

8 Claims, 19 Drawing Sheets

Enter Contact Information — 880

Enter Contact

Name: ▭ — 885
(Enter the name of the person who will be contacted)

Contact Method: ● E-mail  ○ Cell Phone — 887
(Choose how you would like to be contacted)
(If you choose the Cell Phone option, the number you enter must be a cell phone with SMS text messaging capability.)

E-mail Address*: ▭ — 890
(Enter the number or address where you can be reached)

PORTABLE POSITION DETERMINING DEVICE

CROSS REFERENCE TO RELATED APPLICATIONS

The present application is a Continuation-In-Part of U.S. patent application Ser. No. 11/063,254, filed Feb. 22, 2005 now U.S. Pat. No. 7,209,075 and entitled MOBILE OBJECT LOCATOR, which is a continuation of U.S. application Ser. No. 10/361,802 filed Feb. 10, 2003 now U.S. Pat. No. 6,859,171 and entitled "MOBILE OBJECT LOCATOR," which is a continuation of U.S. application Ser. No. 09/862,569 filed May 22, 2001 now U.S. Pat. No. 6,518,919 and entitled "MOBILE OBJECT LOCATOR," which is a continuation of U.S. application Ser. No. 09/362,789 filed Jul. 28, 1999 now U.S. Pat. No. 6,236,358 and entitled "MOBILE OBJECT LOCATOR," which claims the benefit of the filing date of U.S. Provisional Application No. 60/140,040, which was filed on Jun. 18, 1999. The contents of U.S. application Ser. No. 11/063,254, U.S. application Ser. No. 10/361,802, U.S. application Ser. No. 09/862,569, U.S. application Ser. No. 09/362,789, and U.S. Provisional Application No. 60/140,040 are incorporated by reference as part of this application.

TECHNICAL FIELD OF THE INVENTION

The present disclosure pertains generally to electronic personal locating devices for determining the location or position of a mobile object, human or animal, and more particularly, a device for determining the location or position of a mobile object, human or animal by utilizing the capabilities of two-way paging systems or other wireless communication means and global positioning satellite systems.

BACKGROUND OF THE INVENTION

Tracking the location of an individual or an object or even an animal such as a domesticated animal or a pet that can move in unknown directions over a considerable range of territory has been a concern for a number of years. A number of systems have been proposed which employ existing wireless communication capabilities but which tend to be cumbersome, bulky, expensive or all of the above. With the advent of global positioning satellite system (GPS) services, it has been possible to provide relatively inexpensive location systems for determining the location of a moving object. These have typically been utilized on trucks to provide location information for companies that have large fleets of trucks in use at any one particular time. The position of an individual truck is determined by the coincident reception of signals from at least three of the GPS satellites by a satellite receiver, which position can then be stored or can be transmitted to a central receiving station via some sort of wireless link. Moreover, the wireless link can be a two-way communication link wherein the positioning information is only transmitted in response to receiving a request. However, the global positioning system (GPS) has some disadvantages in that it is relatively slow in acquiring the location data and it is strongly dependent upon the target object being in an open area where it is in a line of sight position relative to at least three GPS satellites. A further disadvantage, particularly in a small, portable unit, is that the GPS receiver that must be included in a locating device requires the use of substantial electrical energy during the period in which the location information is being acquired and developed from the GPS system. Further, a small portable object locator, in addition to minimizing the use of electrical power while being subject to less than ideal orientations to enable quick and efficient location by the GPS system, must also be very simple and easy to use.

SUMMARY OF THE INVENTION

The object locator described in the present disclosure and claimed herein comprises the steps of attaching a mobile communications unit having at least one antenna coupled thereto to the mobile object; accessing transmissions of a GPS system from the mobile communications unit to obtain location coordinates of the mobile communications unit; communicating the location coordinates from the mobile communication unit via a paging network or other wireless communications network, e.g., digital cellular network (e.g., Global System for Mobile Communications (GSM), Code Division Multiple Access (CDMA), General Packet Radio Services (GPRS), or third generation (3G) communications protocols), Radio Frequency (RF)-based or satellite-based mobile phone network, or local area or wide area network (e.g., the Internet), alone or in combination, to a base station; and outputting the location coordinates in human readable, audible or otherwise recognizable form for a customer or asset-owner.

In one aspect of the present disclosure a mobile object locator is mounted on or integrated within a collar or harness or similar worn article along with at least one antenna for receiving GPS signals and communicating with a base station. The mobile object locator may be worn or otherwise carried by a human to be tracked or located, whereas the mobile object locator mounted or integrated within a collar or harness or similar worn article is placed around the body or neck of the animal or object to be tracked or located.

Preferably, the mobile object locator is of such small form factor that it may be embedded or integrated within a wearable article, e.g., an article of clothing, a watch, wrist-band, an arm-band, a belt or wasteband, wrist or ankle bracelet, neckless, watch or, as an attachment to a key chain, for example In another aspect of the present disclosure a GPS receiver in the mobile object locator is activated and the GPS location coordinate data processed to determine the location (e.g., latitude and longitude) of the mobile object, human or animal wearing or carrying the mobile object locator.

In another aspect of the present disclosure the mobile object locator communicates with a base station via a paging network or other wireless communications network such as: digital cellular communications network or, other RF-based, satellite-based or Internet-based communications network, alone or in combination, to process a request for location information and the return transmission containing the location information in answer to the request.

In another aspect of the present disclosure the coordinate data obtained from the GPS system may be translated to human readable form in the base station or paging network or other wireless communications network whether a digital cellular communications network or other RF-based, satellite-based or Internet-based communications network, alone or in combination, following transmission from the mobile object locator.

In another aspect of the present disclosure the coordinate data obtained from the GPS system is translated in the mobile object locator prior to transmission to the paging network or other wireless communications network such as: digital cellular communications network or base station from the mobile object locator, whereby the GPS-enabled devices transmit latitude and longitude, which are mapped by device firmware to city and street addresses and used to track and monitor subscriber location and movement.

In another aspect of the present disclosure the mobile object locator communicates with the base station via any suitable wireless communications network such as: digital cellular, RF-based or satellite-based communications network, whereby translation of the coordinate data obtained from the GPS system may be performed before or after its transmission to the base station.

In another aspect of the invention, the mobile object locator communicates directly with a user's access device comprising a cell phone, or a computer via the wireless cellular communications network possibly in conjunction with a data communications network (Internet). Thus, a user may initiate location queries to the mobile object locator directly from the user's access device, and receive alarms or location responses at the user's access device.

Such communications may be made via audio, video, fax, email, instant message, text message, Short Message Service (SMS) message, internet protocol, voice, voicemail, vibration or may stimulate at least one of the five senses. The alert may be communicated via one of the following means of communication: SMS, fax, email, instant message, internet protocol, voice, voicemail, GPRS, CDMA, WAP protocol, internet or text.

In yet another aspect of the present disclosure, the output of the location information may be provided in text, spoken or graphic forms, via a loudspeaker or a display as may be selectable by the user.

In another aspect of the present disclosure, the object locator system may plot the location information on a map or permit the user to manually plot the location information or identify the location of the mobile object locator from the location information message.

In another aspect of the present disclosure, the output of the location information may be forwarded from the base station or paging or other wireless communications network such as: digital cellular communications network or, other RF-based, satellite-based or Internet-based communications network, alone or in combination, or other intermediate station to another remote station.

In yet another aspect of the present disclosure, other information may be associated with and transmitted with or in conjunction with the output of a location information including the time the location data was acquired, the status of the mobile object locator, the condition of the battery in the mobile object locator, whether the mobile object locator is within a pre-determined range or has passed a boundary or electronic fence, or the annunciation of an alarm condition.

In another aspect of the present disclosure, the mobile object locator system may automatically determine the location information, transmit it to the base station or dial up a user location to report the location information.

And in yet another aspect of the present disclosure, the mobile object locator may transmit the location information to a monitoring service and either store the location information for later retrieval or report the location information on receipt to the user.

In yet a further aspect of the invention, a server device associated with a monitoring service is provided that operates in a mobile object locator "tracking" mode for receiving location updates that a user (customer) does not want. The server acts as an intermediary and information store that can be accessed by a user on demand, and as a generator of the alarms and map information.

In another aspect of the invention, the mobile object locator includes functionality for providing storage of a human or animal's medical records, and, is provided with remote health monitoring and diagnostic capabilities and capabilities for compliance monitoring.

BRIEF DESCRIPTION OF THE DRAWINGS

For a more complete understanding of the present invention and the advantages thereof, reference is now made to the following description taken in conjunction with the accompanying Drawings in which:

FIG. 22 depicts an example display having entry fields that will enable a user to specify a contact for receiving an alarm generated by the back-end system.

DETAILED DESCRIPTION OF THE INVENTION

Figure 1:
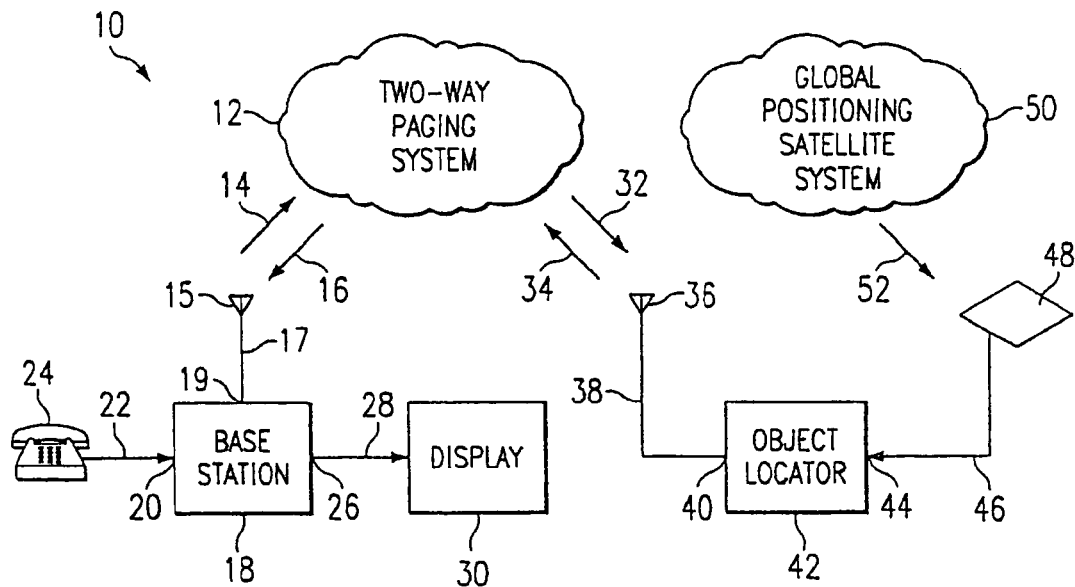
FIG. 1 illustrates a block diagram of an object locator system of the present disclosure.

Referring now to FIG. 1, there is illustrated a system block diagram of the object locator of the present disclosure. In FIG. 1, the object locator system 10 includes a two-way paging system 12, a global positioning satellite system 50 and the object locator 42. The two-way paging system 12 is a conventional paging system that is well known in the art, for example, such as illustrated and described in U.S. Pat. No. 5,423,056 issued Jun. 6, 1995 to Lindquist, et al. and entitled ADAPTIVE CELLULAR PAGING SYSTEM, which patent is incorporated by reference herein in its entirety. The two-way paging system 12 interacts with a base station 18 over a transmit path 14 and a receive path 16. The base station 18 may include a telephone, pager, and the like or may have an input 20 for receiving a dialed-in telephone number from telephone set 24 along communications path 22 or from wireless telephone set 25 over communications path 31. Base station 18 may, in other embodiments, be a paging service center in the two-way paging system 12 or a monitoring service coupled with the two-way paging system 12, instead of a separate operational point of entry for the user to interact with the object locator system 10 of the present disclosure. In general, the input 20 is responsive to dual tone multi-frequency (DT MF) tones transmitted by telephone set 24 or wireless 20 telephone set 25. Base station 18 further has an output 26 from which location data to be displayed travels along path 28 to display 30. Display 30 may be configured to display location information in any of several forms, for example, text, figures, graphics, or numbers. In an alternative embodiment, the two-way paging system 12 may be substituted with a direct RF link or other wireless communication channel. The two-way paging system 12 is shown in the illustrative embodiment of the present disclosure to represent functionally the concepts of the present disclosure.

Continuing with FIG. 1, the object locator system 10 of the present disclosure includes an object locator 42. In one of its operational modes, as a two-way paging transceiver, object locator 42 includes an input 40 coupled to an antenna 36 along cable 38 for receiving signals transmitted by two-way paging system 12 along path 32 and for transmitting paging signals to the two-way paging system 12 along path 34. The object locator 42 also includes an input 44 for receiving from a global positioning satellite (GPS) system 50 location information signals along path 52 to be intercepted by antenna 48 and conducted to the object locator 42 along path 46 to input 44. The global positioning satellite system 50 is of a conventional design well known in the art, an example of which is described in U.S. Pat. No. 5,726,660 issued Mar. 10, 1998 to Purdy, et al. and entitled PERSONAL DATA COLLECTION AND RECORDING SYSTEM, which patent is hereby incorporated by reference herein in its entirety. Alternatively, location information signals may be received from the Glasnoss satellite system currently in use by Russia by the use of a receiving system configured for such reception, or using the European Galileo satellite system.

A further satellite system that may be used for tracking animals and pets according to the invention is the Baidu satellite system recently launched by the Chinese government. In some embodiments, the mobile object locator device can receive signals from multiple systems (e.g., Glonass and GPS) for improved navigation.

In operation, object locator 42 is intended to be carried or attached to an individual, an object or an animal to be located or tracked by the object locator system of the present disclosure. A user enters the system from the base station 18 by dialing the telephone number address corresponding to the object locator 42, which functions as a paging transceiver, for example, on telephone set 24. The telephone number address may also be dialed from wireless telephone set 25 and transmitted via RF channel 31. The DTMF signal then travels along path 22 to input 20 of base station 18 where it is converted to a paging transmit signal and transmitted from antenna 15 along transmit path 14 to the two-way paging system 12. The two-way paging system 12 relays the paging message via transmit path 32 to the antenna 36 coupled to the object locator 42. As will be described in more detail hereinbelow, the object locator 42 processes the request for location information transmitted by base station 18, obtains location information from the global positioning satellite system 50 and transmits a response containing the location information from antenna 36 along path 34 to the two-way paging system 12 which, in turn, relays the location information signal along path 16 to antenna 15 of the base station 18 for processing and display on display 30. This relay of the location information may occur automatically or in response to a specific inquiry. Alternatively, wireless paths 14 and 16 along with antenna 15 may instead each comprise a standard telephone connection to a central office. Thus, a paging center may dial the phone number of the base station to deliver the location information.

Figure 2:
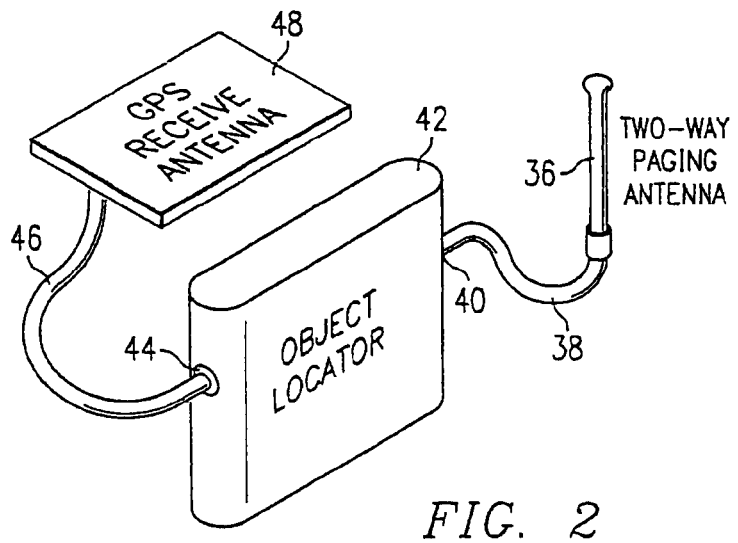
FIG. 2 illustrates a pictorial example of an object locator according to the present disclosure.

Referring now to FIG. 2, there is illustrated a pictorial drawing of an object locator 42 as it may be typically configured with a two-way paging antenna 36 and a GPS receive antenna 48. The two-way paging antenna 36 is coupled to object locator 42 along cable 38 to an input 40 on the object locator 42. Similarly, the GPS receive antenna 48 is coupled along a cable 46 to an input 44 on the object locator 42. The two-way paging antenna 36 shown in FIG. 2 is intended to represent the fact that this antenna in the object locator 42 is typically of the type found with two-way paging equipment. Such an antenna is typically mounted internal to the pager unit itself and is thereby necessarily of very small dimension. However, there may be applications of the object locator 42 of the present disclosure which may be optimized by the use of an external antenna such as shown in FIG. 2. Thus, the illustration of the two-way paging antenna 36 in FIG. 2 is not intended to be limiting, but merely illustrative. The GPS receive antenna 48 is conventionally referred to as a "patch antenna" because of its flat, thin, rectangular shaped design. Typically such a patch antenna is intended to be disposed on an upward, relatively level surface in order to expose it to receive the relatively weak signals transmitted by the global positioning satellite system from the satellites arrayed in the GPS system. The illustration in FIG. 2 thus demonstrates that both of the antennae used in the system may be positioned for optimal reception and transmission and connected to the object locator 42 using the flexible cables 38 and 46 respectively for the two-way paging antennae 36 and the GPS receive antenna 48.

Figure 3A:
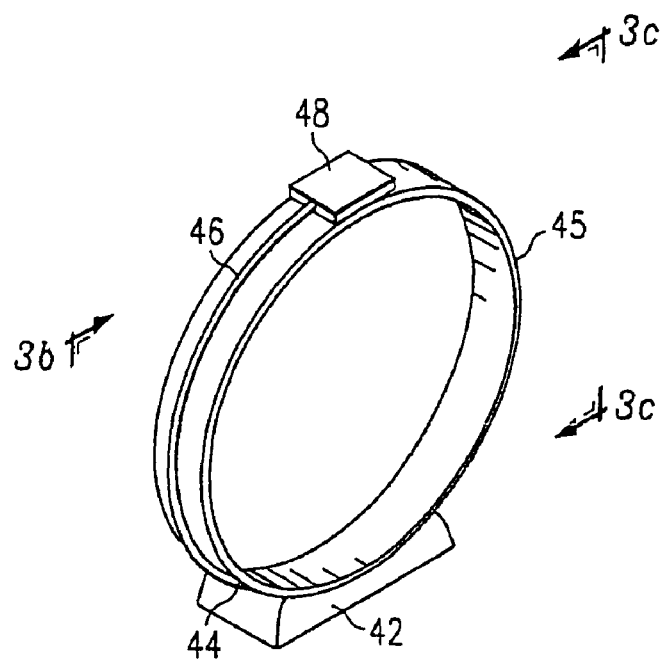
FIGS. 3a-3c illustrate a pictorial drawing of an object locator supported by a collar according to the present disclosure.
Figure 3B:
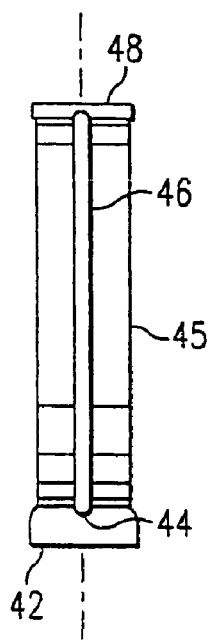
Figure 3C:
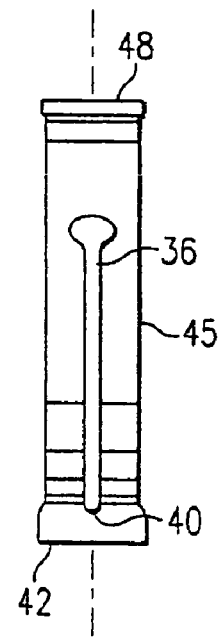

Referring now to FIGS. 3a, 3b and 3c, there is illustrated a pictorial drawing of an object locator 42 mounted on the lower side of a collar 45. Such a collar 45 is configured for supporting an object locator 42 around the body or neck of an animal which is intended to be tracked or located by the object locator 10 of the present disclosure. It will be observed that the GPS antenna 48 is attached to the collar diametrically opposite the position of the object locator. This is intentional as will be described hereinbelow. The object locator is coupled to the GPS antenna 48 through a cable 46 which connects to the input 44 of the object locator 42. This arrangement is illustrated in FIG. 3a and may be more clearly shown by looking at the cross section A-A' illustrated in FIG. 3b. In Section A-A', a side view of the object locator mounted on a collar is shown wherein collar 45 supports the object locator 42 at its lower point and supports the GPS antenna 48 at its diametrically opposite upper point. As before, the GPS antenna 48 is coupled through cable 46 to input 44 of the object locator 42. Similarly, a side view identified by cross section B-B' in FIG. 3c shows the opposite side of the collar-mounted object locator 42 assembly. In Section B-B' there is shown the collar 45 which supports the object locator 42 at its lower end and the patch antenna or GPS antenna 48 at its diametrically opposite upper end. Also shown in the Section B-B' is a representation of the two-way paging antenna 36 which is coupled to input 40 of the object locator 42. It will be appreciated that many configurations are possible for arranging or attaching the object locator and its antennae to the collar 45, including consolidating the locator and antenna as a unit locatably mounted on or in the collar or, alternatively wherein the locator and antenna is distributively arranged on or in the collar. However, it will also be appreciated that the greater mass of the object locator 42 relative to the mass of the GPS antenna 48 and the fact that they are mounted on diametrically opposite sides of the collar 45 enables the object locator 42 to always remain in the lowest possible position and the GPS receiving antenna to always remain in the highest possible position to optimize the reception from the GPS satellite system 50. Not shown in FIGS. 3a-3c is the mechanism such as a clasp or buckle arrangement whereby the collar 45 may be opened and closed to secure the collar around the neck or body of the animal to be tracked or located. Again, many configurations are possible and will be apparent to those skilled in the art.

It should be understood that, in a preferred embodiment, the mobile object locator is of such small form factor that it may be embedded or integrated within a wearable article, e.g., an article of clothing, a watch, wrist-band, an arm-band, a belt or wasteband, wrist or ankle bracelet, neckless, watch or, as an attachment to a key chain, for example. Thus, the mobile object locator may be discretely, unobtrusively or secretly carried by children, pets, or the elderly. Furthermore, the mobile object locator of such small form factor includes a water resistant and waterproof housing (waterproof to at least 1 fathom).

Figure 4:
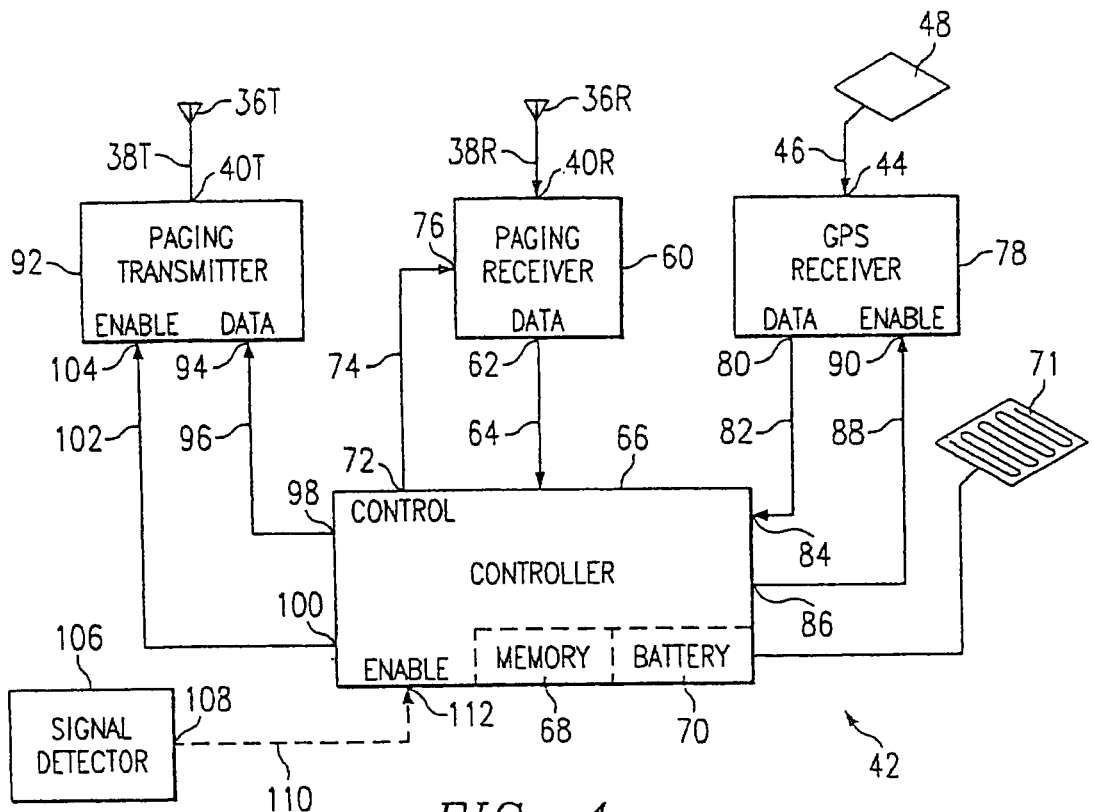
FIG. 4 illustrates a block diagram of the object locator of the present disclosure.

Referring now to FIG. 4, there is illustrated a block diagram for the object locator 42 of the object locator system 10 of the present disclosure. A paging receiver 60 or other digital wireless communications receiver is shown coupling a data output 62 along path 64 to an input of controller 66. Controller 66 includes a memory 68 for the storage of location data and a battery 70 for powering the object locator 42. This battery 70 is, in the present disclosure, a rechargeable battery. This battery 70 can be a NiCad battery or a Lithium-Ion battery. A solar cell 71 is provided for charging the battery 70 which may comprise a conventional crystal silicon solar cell or a thin film solar cell made, for example, from a Cadmium telluride (CdTe cell). The silicon solar cell may alternately comprise a multilayered device such as a compound structure of copper, indium, gallium and selenium (CIGS). Other high-efficiency solar cells that may be used for the recharging may include: Gel battery, GaAs cells, Organic/polymer solar cells, and silicon thin-films which depending upon the deposition's parameters comprise amorphous silicon (a-Si or a-Si:H), protocrystalline silicon or Nanocrystalline silicon (nc-Si or nc-Si:H). Alternately, standard or non-rechargeable and replaceable batteries may be used as well.

As further shown in FIG. 4, the controller 66 further includes a control output 72 which is coupled along path 74 to a control input 76 of paging receiver or like digital wireless communications receiver 60. Paging or like digital wireless communications receiver 60 receives paging or wireless communications via antenna 36R which are coupled along cable 38R to RF input 40R of paging receiver 60.

Continuing with FIG. 4, there is shown a GPS receiver 78 for which provision is made to couple location data at an output 80 along path 82 to an input terminal 84 of controller 66. GPS receiver 78 further includes an enable input which is coupled from controller 66 at output 86 along path 88 to the enable input 90 of the GPS receiver 78. The GPS receiver 78 receives GPS signals from the global positioning satellite system 50 at antenna 48 which signals are coupled along path 46 to RF input 44 of the GPS receiver 78. In an alternative embodiment GPS receiver 78 may be configured for the reception of differential GPS (D-GPS) signals to enhance the accuracy of determining the location coordinates. Moreover, besides D-GPS, other GPS systems employing external accuracy augmentation systems such as A-GPS (Assisted GPS) and HA-GPS (Hybrid, Assisted GPS), e.g., such as the gpsOne™ (provided by Qualcomm Inc.), may be used to enhance the accuracy of determining the location coordinates. It is understood that other network assisted positioning techniques may be implemented including, for example, E-OTD (Enhanced Observed Time Difference) which is a network assisted positioning technique governed by a provision of the location services (LCS) capability described in the 3GPP standard. Additional satellite systems that may be implemented include the emerging GPS Phase III.

Non-GPS based solutions for providing geo-location capability is additionally contemplated for use by the object locator system of the invention; for instance, network-based triangulation and cell tower location techniques may be implemented. For example, by establishing a sparse network of towers of known height with the relative locations of the towers in the network known, three (3) towers may be used to triangulate the location of the object locator. This method is useful for determining planar positions and may be used to determine at least two coordinates, longitude and latitude, sufficient for determining any position on a globe. Additionally, 3G (third generation) MIMO (multiple-input, multiple-output)) based wireless systems may be employed for geo-location applications in accordance with the present invention. Additionally, the emerging UWB (Ultra-wideband) Position-Location Networks (U-PoLoNets) may be utilized for tracking position of the object locator.

Further illustrated in FIG. 4 is a paging transmitter or like digital wireless communications transmitter 92 which is configured to transmit the location data provided by controller 66 at output 98 along path 96 to the data input 94 of paging transmitter 92. Controller 66 also provides an enable output at output 100 along path 102 to the enable input 104 of paging or like digital wireless communications transmitter 92. The paging transmitter 92, when enabled, transmits data received at the data input 94 and couples the signal to be transmitted from the output terminal 40T along path 38T to the paging transmitter antenna 36T for radiation to the two-way paging system 12. It will be appreciated that the paging system components, while shown as separate functional elements in FIG. 4, may in fact be integrated into a single two-way paging transceiver which share a common antenna represented by reference number 36. The illustration shown in FIG. 4 is intended to provide clarity as to the signal paths that operate during the communication relationship of the object locator 42 with the two-way paging system 12. A number of configurations for coupling the antenna to the paging transceiver are feasible and are also well known in the art and will not be described further herein.

Alternately, the system employing a digital wireless communications transmitter, when enabled, transmits data received at the data input 94 and couples the signal to be transmitted from the output terminal 40T along path 38T to a wireless communications antenna 36T for radiation to a cellular communications network.

Continuing with FIG. 4, there is shown a block labeled "signal detector" 106 having an output 108 which is coupled along path 110 to an enable input 112 of controller 66. The signal detector 106 represents any of several optional devices which may enable the more precise control of the object locator 42 by limiting the operation of the object locator 42 to certain external conditions outside the paging communications or the GPS reception areas by the object locator 42. In the illustrative example shown in FIG. 4, the signal detector 106 provides an output whenever its detection threshold is crossed by signal energy picked up by antenna 105 from an independent source. In an alternative embodiment a signal detector 106 may be used to measure the RF signal energy, i.e., the signal field strength noise or the signal-to-voice ratio, for example, that is present at antenna 36R shown in FIG. 4. Such threshold, for example, may represent a limiting point beyond which the object locator is enabled to operate e.g., by an electronic fence or, the threshold may represent a distance within which a position of the object locator will probably provide no useful information since the object locator 42 may be within line of sight to the base station, for example. Or, the threshold may be expressed in terms of time or altitude or as an azimuth heading. Alternatively, the object locator 42 may be programmed for operating an alarm when the object locator 42 moves outside a perimeter. Such perimeter may be programmed by physically positioning the object locator 42 at extremes of an area and, while the GPS receiver 78 is operating, storing in the object locator's memory the coordinates reported, thus establishing a boundary outside of which the object locator 42 will automatically report a position. Additionally, the perimeter may be defined by at least one coordinate stored in the object locator memory. The perimeter is then determined by selecting stored algorithms to define the limits of a circular or other geometrical shape outside of which the object locator 42 will automatically report a position.

Continuing with FIG. 4, it will be appreciated that each of the major functional blocks shown in FIG. 4 may be implemented by means of integrated circuitry which may be configured to fit within a housing of very small dimensions. For example, a pocket pager that typically occupies a volume of approximately three to five cubic inches may weigh approximately four to six ounces. The controller 66 may comprise a single chip microprocessor or microcontroller or digital signal processor which may be programmed to provide a variety of functions and operational features. Such programs may be stored in memory 68 for use by the controller 66 in controlling the operation of the object locator 42. The paging receiver 60, the paging transmitter 92 and the GPS receiver 78, while shown as functional blocks, in reality, each may have a number of complex functions incorporated therein. Thus, many configurations and functional operations are possible within the scope of the block diagram illustrated in FIG. 4. For example, the GPS receiver 78 in the object locator 42 may be enabled or activated at periodic intervals by a timer (not shown) in the controller 66, or alternately, via a scheduled or ad-hoc activation signals received over the Internet, via OTA transmissions, or via the cellular phone communications network or paging network. Such periodic activation is useful when operating the object locator 42 as a tracking device or for automatically acquiring and transmitting location information to the paging system or cellular phone system 12 or to the base station 18. In another embodiment, the GPS receiver 78 may be enabled or activated by command from the two-way paging system 12 or from a monitoring service which functions as a base station for a plurality of customers making use of object location services. Such paging system or monitoring service may communicate the location information to a user or a base station by wireless or wired channel means. The detailed description which follows will illustratively provide descriptions of some of the basic operational features of the object locator system 10 of the present disclosure. One such feature represented by the signal detector block 106 will be described hereinbelow in conjunction with FIG. 7.

Figure 5:
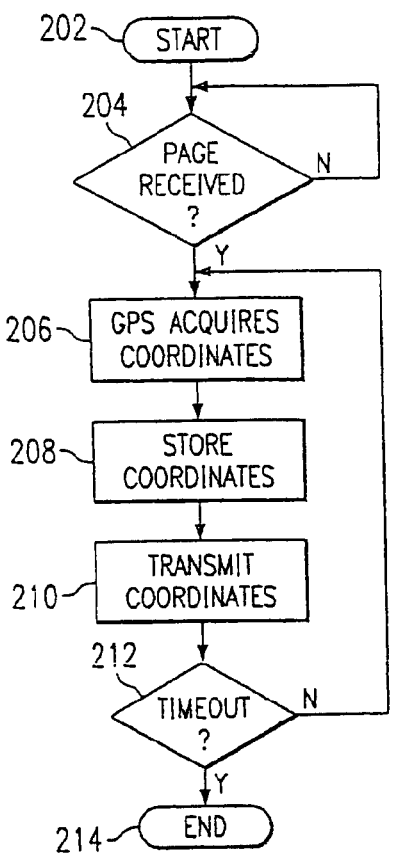
FIG. 5 illustrates a flowchart of the operation of the object locator generally.

Referring now to FIG. 5, there is illustrated a flowchart for the operation of the object locator 42 shown in FIG. 4 in the case where the user desires to determine the location of the object locator 42. This circumstance may represent any number of user activities including an owner's efforts to determine the location of a pet dog or a pet cat, for example, or a child, or a person who may have Alzheimer's or similar cognitive impairment or condition. Similarly, the operation illustrated in FIG. 5 may also include a situation where an owner desires to track versus time, an object to which the object locator 42 is attached. Further, the flowchart of FIG. 5 may also illustrate the situation when the object locator 42 is attached to or carried by a person and it is desired to know the location of that person at some particular time or some other previous time as further described below. The flow begins at block 202 with the start of the sequence of operations, which is followed by decision block 204 in which the object locator 42 seeks to determine whether a page or like activation signal, e.g., an SMS message, requesting location information has been received by the input 40 of the two-way paging receiver 60 or like digital wireless communications receiver. If the result of this determination is in the negative, then the flow returns to the input of the decision block for a retry. If, however, the result of the query was affirmative, then the flow proceeds to block 206 in which the GPS receiver 78 is enabled to acquire the location coordinates of the object locator 42 by recurring signals from the global positioning satellite system 50 illustrated in FIG. 1.

Upon successfully acquiring the coordinates of the object locator 42 and thus of the individual object or animal to which the object locator 42 is attached, the object locator 42 then operates to store the coordinate information in block 208 by loading the coordinate information into the memory 68 of the controller 66 in the object locator 42. Such coordinate information may be associated with a time stamp. Such time stamp, derived from the GPS satellite system, may then be stored in block 208 for later retrieval. Additionally, such coordinate information may further be associated with other data for communication to a base station such as object locator operational status, strength of transmitted signals, traversal of a threshold, battery condition, alarm signals and the like. The flow then proceeds from block 208, where the coordinates were stored in the memory 68, to block 210, wherein the object locator 42 is configured to transmit the coordinates in response to the request received over the two-way paging system 12. The transmission of coordinates will occur in the opposite direction utilizing the same two-way paging system 12 over which the request for location coordinates was received in block 204. Following the transmission of the coordinates in block 210, the flow proceeds to a timer block 212 which provides a measured interval of time during which the object locator 42 attempts to acquire the coordinates at the particular time from the GPS system 50. It is well known that a typical GPS system often takes a substantial amount of time to acquire location coordinate information from a sufficient number of satellites in order to fix the location of the object locator 42 with a sufficient degree of precision. The time required involves receiving several signals under conditions which may vary widely from instant to instant, which impairs the ability of the GPS receiver 78 as shown in FIG. 4 to obtain complete location data to respond to the request received by the paging receiver 60 in the object locator 42. The time value represented by the timer operating in block 212 may be on the order of five to ten minutes, for example. In block 212, if the timer has not reached the time-out value, then the flow returns to the input of block 206 where the object locator 42 again attempts to acquire the coordinates from the GPS system 50. Returning to block 212, if the timer has reached its end value, then the flow proceeds from block 212 to block 214 where the routine ends. This timed step operates to maximize the opportunity to obtain and acquire location information as well as to limit the use of power by the GPS receiver 78. FIG. 5 thus illustrates a basic mode of operation of the object locator 42. It will be appreciated that many variations on this basic operating mode are possible and may be used to enhance the operation of the object locator 42. Such features may be programmed into the controller 66 of the object locator 42.

Figure 6:
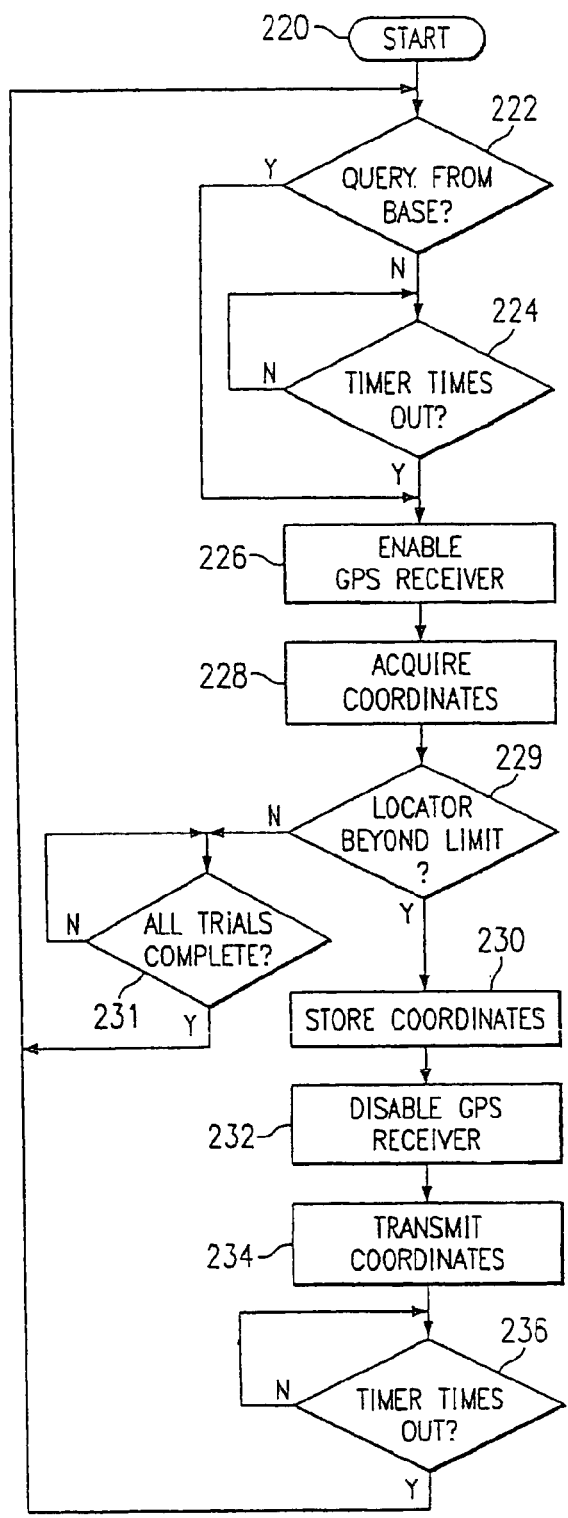
FIG. 6 illustrates a flowchart of the operation of the object locator subject to an additional external control.

Referring now to FIG. 6, there is illustrated a flowchart for the operation of the object locator 42 in the circumstance where it is activated to obtain location information from the GPS receiver 78 only, in this illustrative example, when the object locator 42 is in a position beyond a distance limit relative to the base station or some other defined location from which the request for location coordinates was initiated. The flowchart in FIG. 6 also shows additional steps in the operational sequence which may be used to enable and disable the GPS receiver 78 within the object locator 42. As was pointed out previously, the GPS receiver 78 is typically a device which requires substantial electrical power to operate and so it is to the advantage of the object locator system 10 of the present disclosure to attempt to minimize the power drawn from the object locator battery 70 in FIG. 4. This may be accomplished by limiting the operating cycle of the GPS receiver 78 to become operational only long enough to obtain the coordinate information that is required by the object locator 42.

The flow begins in FIG. 6 with a start block 220 from which the flow proceeds to a block 222, wherein the object locator 42 determines whether the object locator 42 is beyond a predetermined limit such as a minimum distance from the base station or other defined location making the request for location information. If the determination is in the negative, that is, the object locator 42 is not beyond the predetermined limit, then the flow returns to the input of the decision block 222 for another attempt. This looping will continue as long as the object locator 42 is within the predetermined limit established by circuitry within the object locator 42 and other portions of the object locator system 10 of the present disclosure. The functional operation of an illustrative example of such a predetermined limit feature will be described further hereinbelow in conjunction with FIG. 7.

Returning now to the flowchart of FIG. 6, the flow proceeds from start block 220 to a decision block 222 to determine whether the object locator 42 has received a query from the base station 18. If a query has not been received, the flow proceeds along the "N" path to a timer block 224 wherein the object locator 42 may operate a timed sequence to periodically enable the GPS receiver 78 to acquire location coordinates whether or not a query is received from the base station 18. When the timer of block 224 times out, the flow proceeds along the "Y" path to a block 226 to enable the GPS receiver 78. Returning to decision block, 222, if the object locator 42 did receive a query from the base station 18, the flow proceeds along the "Y" path to block 226 to enable the GPS receiver 78.

Continuing with FIG. 6, the flow in the object locator 42 proceeds from block 226 to block 228 to acquire the coordinates of the location of the object locator 42. Thereafter, the flow proceeds to decision block 229 to determine whether the object locator 42 is beyond a predetermined limit with respect to the base station 18. If the result of the determination in block 229 is negative, the flow proceeds along the "N" path to decision block 231 wherein a counter provides for a predetermined number of trials to establish whether the object locator 42 is beyond the predetermined limit required in block 229. If the counter in decision block 321 has not completed the last count, i.e., has not completed all attempts or trials to determine whether the object locator 42 is beyond a limit, the flow proceeds along the "N" path to re-enter block 228 to acquire location coordinates. When the counter in block 231 completes the last count, the flow proceeds along the "Y" path to the input of the decision block 222. Returning now to decision block 229, if it is determined that the object locator 42 is beyond the predetermined limit, the flow proceeds along the "Y" path to block 230 to store the location coordinates acquired from the GPS satellite during the step performed in block 228, wherein the enable signal applied to the enable terminal 90 thus operates to awaken the GPS receiver 78 so that it may communicate with the GPS system and obtain location information coordinates for the object locator 42. Thus, the flow proceeds from block 226 where the GPS receiver 78 is enabled to a block 228 where the object locator 42 acquires the coordinate information from the global positioning satellite system 50.

Continuing with FIG. 6, upon acquiring the coordinates of the object locator 42 from the GPS receiver 78, the controller 66 within the object locator 42 causes the location information to be stored in the memory 68 of the object locator 42 in the operational block 230 of FIG. 6. The flow then proceeds to a block 232 where the controller 66 operates to disable the GPS receiver 78 such that it will no longer continue to drain power from the battery, until the next time that it is desired to acquire coordinate information from the GPS system 50. Following the disabling of the GPS receiver 78 in block 232, the flow proceeds to a block 234 wherein the object locator 42 provides the location data on output terminal 98 along path 96 to the data input 94 of the paging transmitter 92. The location information is then transmitted via the two-way paging system 12 to the base station 18 shown in FIG. 1. The flow proceeds from block 234 following the transmission of the coordinate information to a time-out block 236 where a timer provides an interval of time in which the object locator 42 is permitted to acquire the coordinate information from the GPS system, thus maximizing the opportunity to acquire the coordinates before the object locator 42 becomes inactive. Here the time-out value may again typically be on the order of five to ten minutes, although the time duration may legitimately be any value that corresponds with the particular circumstances of use and, in fact, may be adjustable in some applications. In the event that the time-out value has not been reached in block 236, the operation loops back around to the input of the time-out block 236 and enables the object locator 42 to continue attempting to acquire the location information from the GPS system. In the event that the time-out value has been reached, then the flow proceeds along the "Y" path from block 236 back to the start of the sequence at the input to the decision block 222 where the object locator 42 is enabled to check whether the object locator 42 is positioned beyond the predetermined limit as previously explained.

As an alternative methodology for conserving battery power, the mobile locator device may be equipped with an accelerometer device that is operable to put the locator device to sleep when the pet or wearer has not moved for a preset amount of time, e.g. such as when the wearer is sleeping or at rest. In one embodiment, the accelerometer device may comprise a Piezo-film or piezoelectric sensor, a Surface Micromachined Capacitive (MEMS)—Analog Devices, Freescale, Honeywell, Systron Donner (BEI), a Thermal (submicron CMOS process) such as available from MEMSIC; a Bulk Micromachined Capacitive such as available from VTI Technologies; a Bulk Micromachined Piezo Resistive; a Capacitive Spring Mass Based such as available from Rieker Inc., an Electromechanical Servo (Servo Force Balance); a Null-balance type; a Strain gauge type; a Resonance type; a Magnetic induction type; an Optical; a Surface Acoustic Wave (SAW) type.

Further sensor devices may be implemented in the object locator device. For example, besides a motion detector (e.g., accelerometer), there is additionally provisioned in the object locator device, a temperature sensor for sensing the ambient temperature of the device which, as will be described in greater detail herein, is monitored by the back-end infrastructure and reported to a user if a programmed temperature range has been exceeded.

Figure 7:
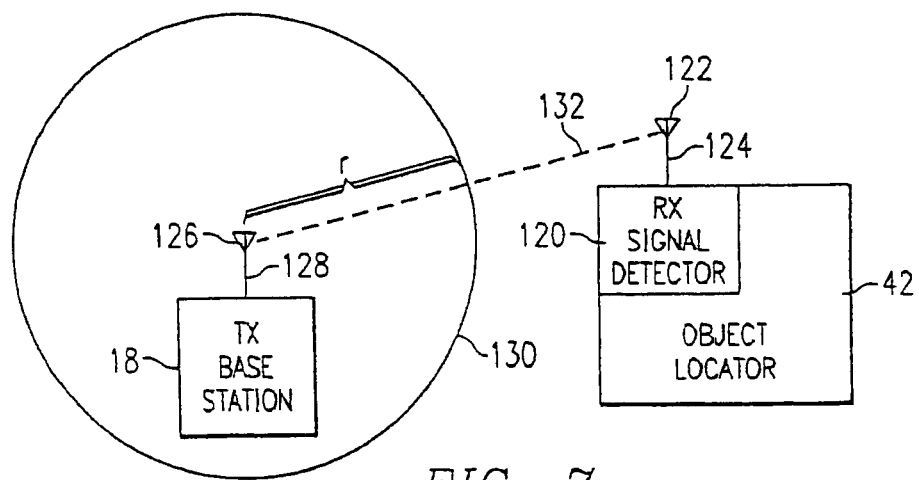
FIG. 7 illustrates a pictorial drawing of a range dependent enablement system used to provide external control for the object locator.

Referring now to FIG. 7, there is illustrated a pictorial block diagram of one configuration that is possible to provide the predetermined limit signal to the object locator 42. Shown in FIG. 7 is a base station 18 coupled with its antenna 126 through a cable 128 and operating to produce a signal which is radiated according to the radiation pattern characteristic of the antenna 126 of the base station. Also shown in FIG. 7 is an object locator 42 which includes a signal detector block 120 coupled to an antenna 122 through a cable 124. It will be noted that the base station 18 is operating in a transmit mode and the object locator 42 is operating in a receive mode via antenna 122. The object locator 42, by comparing the received signal strength of the signal transmitted by the base station from antenna 126 with a reference signal stored within the signal detector 120, is able to make a determination as to where it is in relation to the base station in terms of the distance that separates the object locator 42 and the base station 18. It is presumed in this example that the signal strength measured between the base station 18 and the object locator 42 falls off in a predictable manner as compared with the distance that separates the object locator 42 from the base station 18. An alternative to comparing the limit signal with a reference value is to simply utilize the signal-to-noise characteristics of the receiver in the object locator 42. When it is no longer possible to acquire or capture the signal from the base station 18, a limit is thereby provided. The limit may be adjusted simply by adjusting the base station signal strength. By way of illustration, a predetermined limit may thus be established by controlling the signal strength of the base station 18 signal such that at an imaginary boundary 130 surrounding base station 18 is defined. The signal strength is of a sufficiently low value which can just be detected by the signal detector 120 in the object locator 42 at the imaginary boundary 130. Thus, if the object locator 42 antenna 122 is greater than a distance indicated by the radius "r" from the base station 18, then no signal will be detected (or it will be below an acceptable threshold) and the object locator 42 is presumed to be beyond the predetermined limit represented by the distance "r", which may be thought of as an acceptance radius. If, however, the object locator 42 receives or detects the signal emitted by the base station 18 (or it is above the predetermined threshold), then it is presumed that the antenna 122 of the object locator 42 is within the radius "r" and the object locator 42 must not be, at that point, activated to attempt to acquire location information from the GPS system 50.

Figure 8:
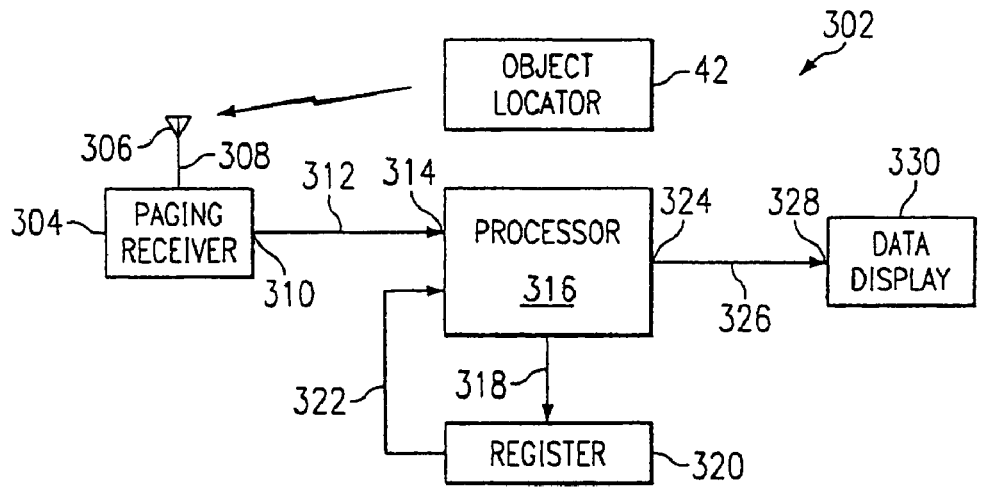
FIG. 8 illustrates a block diagram of a base station that may be used with the object locator of the present disclosure.

Referring now to FIG. 8, there is illustrated a block diagram including features which may be implemented in the base station 18 to process the location information received from the object locator 42. In the one embodiment shown in FIG. 8, the base station 302 includes a paging receiver 304 which has a receiving antenna 306 coupled to the paging receiver 304 by a cable 308. The output of paging receiver 304 is supplied at an output 310 along path 312 to an input 314 of a processor 316 which receives and processes the location information for output or display. In the illustrative example of FIG. 8, the information is stored along a path 318 in a register 320 from which the information can be retrieved along path 322 by the processor 316 for output at terminal 324 along path 326 to the input 328 of a data display 330. In this simple example illustrated by the block diagram of FIG. 8, the location information is processed for display as data which may be in the form of degrees of longitude and latitude, the names of the closest major street intersections or in terms of polar coordinates such as an azimuth heading and a distance between the base station 302 and the object locator 42. In alternative embodiments, the location information may be translated or converted during the processing operation into voice signals for output as a spoken message via an audio output device (not shown in FIG. 8) or translated or converted into a form for plotting on a map using such means as at least alpha-numeric characters. In other alternative embodiments, the location information may be forwarded from the base station 18 to another remote device or station.

Figure 9:
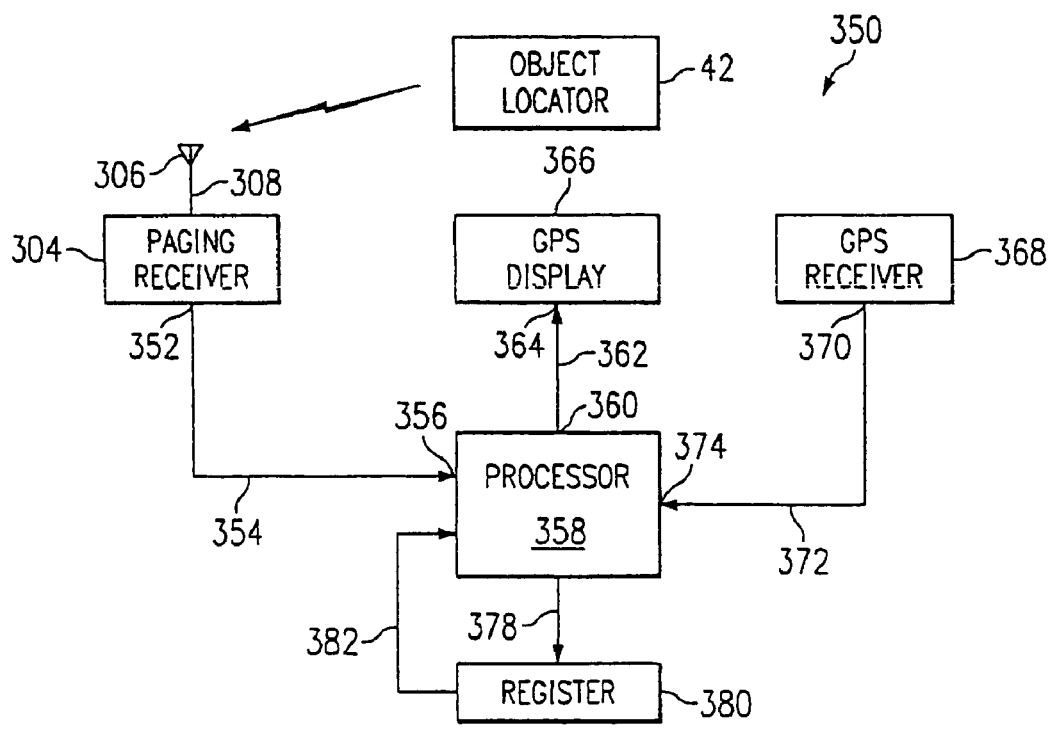
FIG. 9 illustrates a block diagram of an alternate embodiment of a base station that may be used with the object locator of the present disclosure.

Referring now to FIG. 9, there is illustrated an alternate embodiment showing a base station 350 which includes a paging receiver 304. Paging receiver 304 receives location information transmitted by object locator 42 to the antenna 306 of the paging receiver 304 along cable 308. Paging receiver 304 is coupled from an output 352 along path 354 to an input 356 of processor 358 in the base station 350. Processor 358 may also have access to a register 380 along path 378 from which the processor 358 may further obtain stored location information along path 382 from register 380. Such location information is, of course, available from the GPS receiver 368 via antenna 382 and cable 384 which information is coupled at an output 370 along path 372 to an input 374 to processor 358. This GPS receiver 368 is part of base station 350 and enables the base station 350 to provide an enhanced display of the location information obtained from the object locator 42.

Continuing with FIG. 9, there is shown a GPS display 366 that obtains data concerning the location coordinates from processor 358 at an output 360 which flows along path 362 to an input to the GPS display 366 at input 364. The GPS display 366 is configured to provide a map of the area that includes both the base station 350 and the object locator 42, and thus display the relative position of each component of the object locator system 10 with respect to the other. As is typical with GPS display units, a map may be shown with streets or thoroughfares indicated thereon and indicia included in the display showing the respective location of the base station 350 and of the object locator 42. In another aspect, a base station 350 may include mobile devices other than paging receivers, e.g., cellular phones, PDAs, etc.

The embodiments described in FIGS. 8 and 9 are intended to be illustrative and not limited to the specific embodiments described for the purpose of illustrating the concepts and principles of the present disclosure. Output of location information in the form of alpha-numeric text, spoken messages or map displays may be implemented in any of several configurations that may be contemplated. Moreover, provision may be included to enable the user to select which output means is desired. Further, certain outputs of location information may be indicated by or accompanied by an alarm instead of or in addition to the selected output. Further, when the output is, for example, in a text format or a spoken format, the information provided may be used to manually plot the location coordinates on a geographic map of the area in which the object locator 42 is being used. In yet another embodiment of the present disclosure, the processing of coordinate data produced by the GPS receiver may include translation or conversion of the coordinate data into human readable form by the controller 66 (see FIG. 4) in the object locator 42 prior to the transmission of the location information to the paging system 12 or the base station 18 (see FIG. 1). In yet another embodiment of the present disclosure, the location information may be forwarded from the base station 18 to another remote device or station.

Figure 10:
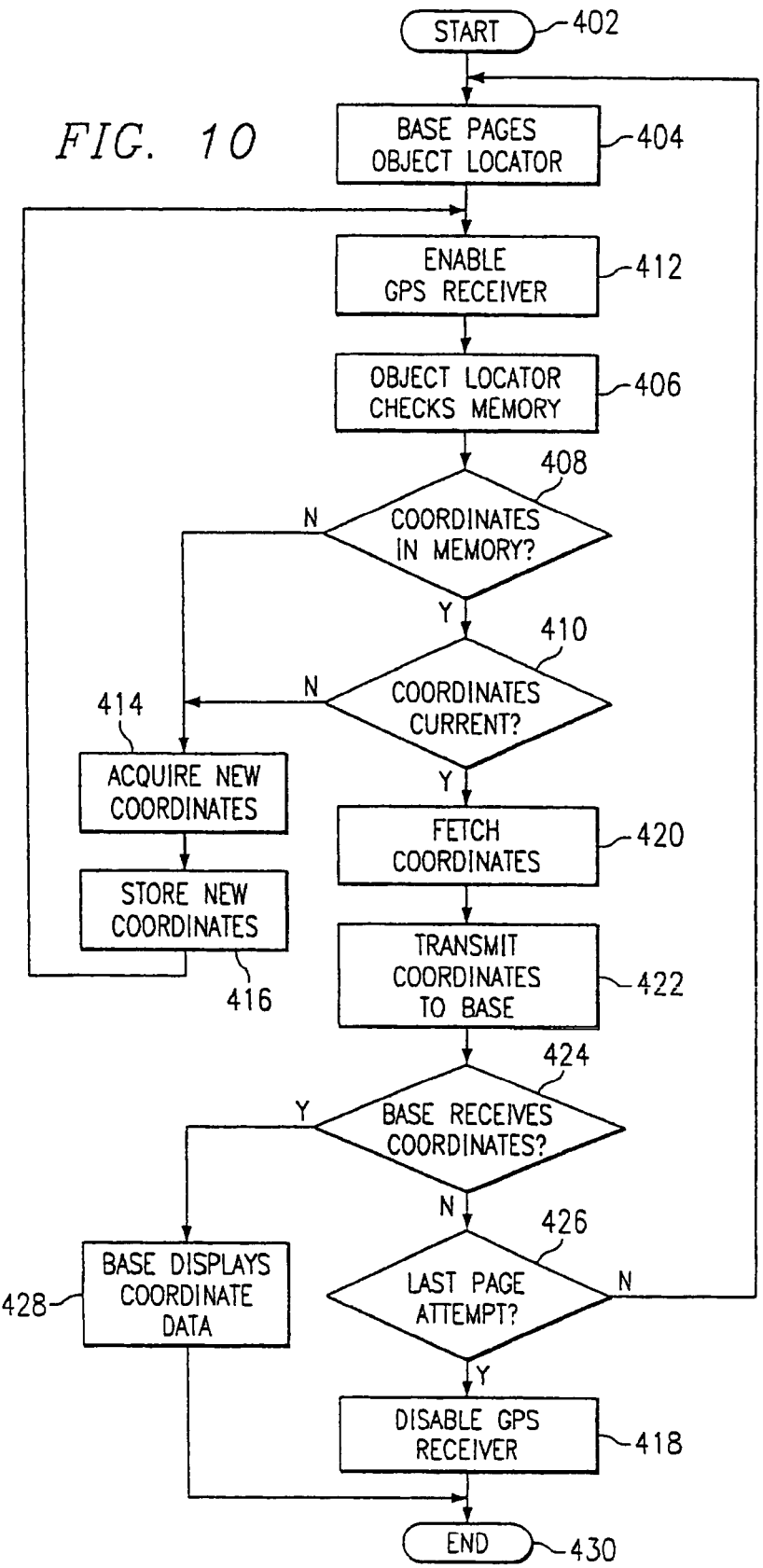
FIG. 10 illustrates a flowchart of the operation of the object locator system of the present disclosure in obtaining location data via two-way paging.

Referring now to FIG. 10, there is shown a flowchart of the operation of the combined units of the object locator system 10 of the present disclosure as illustrated in FIG. 1. The flow begins at block 402 where the routine starts and thereupon flows to a block 404 in which the base station 18 requests location information by paging the object locator 42. In this block 404, the base station 18 transmits a request for location information to the object locator 42. The flow proceeds from block 404 to block 412 where the object locator 42 proceeds through the sequence to enable the GPS receiver 78 in order to obtain new location coordinate information. Thereupon the flow proceeds to a block 406 wherein the object locator 42 checks its own memory—see, for example, the block diagram of the object locator 42 shown in FIG. 4—whereupon the flow proceeds to block 408 where the object locator 42 determines whether, in fact, there are coordinates in its memory. If the result is in the affirmative, then the flow proceeds along the "Y" path to a block 410 where a determination is made by the object locator 42 whether the coordinates stored in its memory are current. If the result in block 410 is affirmative, then the flow proceeds along the "Y" path to a block 420 where the object locator 42 will fetch the coordinate information from its memory 68 shown in FIG. 4 and set up the object locator 42 to transmit the coordinates to the base station in a block 422. Thereupon the flow proceeds to a block 424 wherein the base station 18 makes a determination as to whether it has received the requested coordinate information from the object locator 42. If the result is affirmative, then the flow proceeds along the "Y" path to a block 428 where the base station 18 proceeds to output or display the coordinate information to the user at the base station 18. Thereupon, the flow proceeds from block 428 to a block 430 wherein the routine ends.

Returning to block 424 of FIG. 10, if the base station 18 determines that it did not receive the coordinate information as requested, then the flow proceeds to block 426 along the "N" path to a decision block 426. In block 426, the base station 18 determines whether the most recent page of the object locator 42 was, in fact, the last attempt permitted within the protocol for the base station operation. If the result is affirmative, then the flow proceeds along the "Y" path to block 418 where the object locator 42 operates to disable the GPS receiver 78 so that it no longer uses power from the battery 70 of the object locator 42 and thereafter proceeds to block 430 where the routine ends. If, however, the result of the determination in block 426 was negative, then the flow returns to the start of the routine at the input to block 404 where the base station 18 re-attempts to page the object locator 42.

Returning now to block 408 in FIG. 10, the object locator 42 checks to determine whether location coordinate information is, in fact, in the memory 68 of the object locator 42. If the result is negative, the flow proceeds along the "N" path to block 414 where the object locator 42 acquires the new coordinate information and, as previously described, proceeds in block 416 to store the new coordinate information in memory 68 of the object locator 42. The flow then returns to the input of block 412 wherein the GPS receiver 78 is enabled.

The above noted object location system was disclosed as being utilized in conjunction with a pet, such that the pet owner can determine the location of their wayward pet. The locator, as described hereinabove, in one embodiment, is triggered to determine the location of the pet in response to receiving a signal from a paging system. The paging system utilizes existing infrastructure in order to direct a message over a wireless link to a moving object, such as the pet. This only requires the inclusion of a paging receiver tuned to the frequency of the paging transmitters. Of course, there are multiple paging transmitters disposed about any given area. If the pet wandered outside of the range of all of these paging transmitters, then the system will not work. This would then, in the alternative, require a direct RF link to the pet.

Once the object locator 42 has received the request, the locator 42 will do one of two things. First, it could merely search its own memory to determine if location coordinates are stored therein from a previous acquisition operation of the GPS system. If so, these could be transmitted back to the requester. Alternatively the GPS system is turned on in response to receiving the request and then the location determined. Of course, as described hereinabove, there are provisions made for situations wherein the GPS system cannot be acquired.

When the information is to be transmitted back to the user, the disclosed embodiment sets forth the use of a two-way pager. These two-way pagers are desirable in that they make use of the existing infrastructure of the paging system. This is facilitated by the inclusion of a plurality of receivers at each of the paging towers or paging "sticks" which allow the signal to be received and forwarded back to a central station. This central station then processes the information received and forwards it to the user. This information, as described hereinabove, is in the form of coordinates. This coordinate information can then be relayed back to the user in any number of ways. It could actually be forwarded via a paging channel to the user, which might result in a latency of approximately two to five minutes. Alternatively, it could be transmitted directly to the user, providing there was such an infrastructure. This infrastructure could even incorporate the use of a cellular telephone system. In any event, it is necessary to have the coordinates relayed back to the user in order to determine the relative location of the user and the wayward pet. The two-way system that can be utilized is a conventional system, one example of such a conventional system described in U.S. Pat. No. 5,708,971, issued Jan. 13, 1998, and entitled "TWO- WAY PAGING SYSTEM AND APPARATUS," which is incorporated herein by reference.

Figure 11:
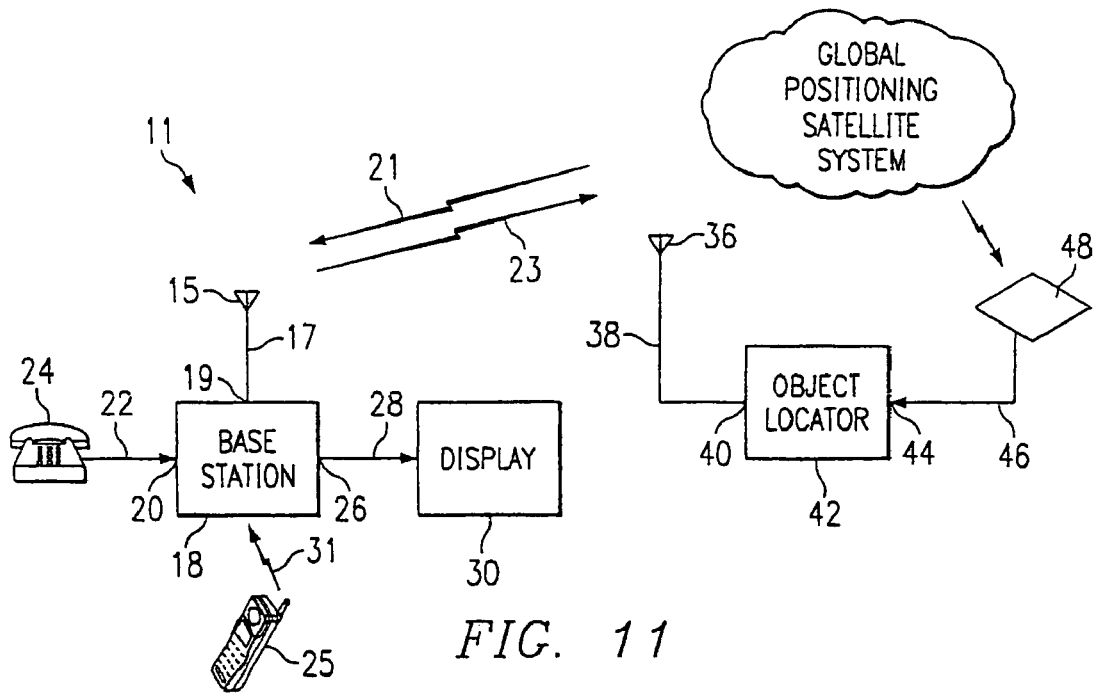
FIG. 11 illustrates a block diagram of an alternative embodiment of an object locator system of the present disclosure.

Referring now to FIG. 11, there is illustrated a system block diagram of an alternate embodiment of an object locator system of the present disclosure. In FIG. 11, the object locator system 11 includes a base station 18, an object locator 42 and a global positioning satellite system 50. The base station 18 and the object locator 42 communicate directly with each other over a wireless link shown by the pair of arrows, arrow 21 and arrow 23. This wireless link 21, 23 will be described further hereinbelow. The base station 18 may include a telephone, pager and the like or may have an input 20 for receiving a dialed-in telephone number from a telephone set 24 along communications path 22 or from a wireless telephone set 25 over communications path 31. In general, the input 20 is responsive to dual-tone multi-frequency (DTMF) tones transmitted by telephone set 24 or wireless telephone set 25. Base station 18 further has an output 26 from which location data to be displayed travels along path 28 to display 30. Display 30 may be configured to display location information in any of several forms, for example, text, figures, graphics, or numbers. In a typical graphics display, a map of the region in which the object locator 42 is operating may be displayed with the location coordinates for the object locator displayed on the map reproduced on display 30. The wireless link 21, 23 may be any radio frequency communications channel operable between two stations such as a direct RF link in a system having a base station and a mobile station and not requiring an intermediate station to relay transmissions between the base and mobile stations. Or, in the alternative, the wireless link 21, 23 may utilize satellite communications to link together the object locator 42 and the base station 18 shown in FIG. 11. In such a system, the antenna 15 and 36 and their associated transmit and receive structures are, of course, configured for satellite communications which will then occur as represented by wireless link 21, 23. Thus, the wireless links 21, 23 may be implemented by numerous alternative means that are well known in the art and will not be described further. One example, shown in the illustrative embodiment of FIG. 1 utilizes a two-way paging system to provide the RF or wireless link between the base station 18 and the object locator 42.

Continuing with FIG. 11, the object locator system 11 of the present disclosure includes an object locator 42. The object locator 42 includes an input 40 coupled to an antenna 36 along cable 38 for receiving signals transmitted in the wireless link from the base station 18. The object locator 42 also includes an input 44 for receiving location information signals from a global positioning satellite (GPS) system 50 via the RF path 52 and intercepted by antenna 48. From antenna 48, the GPS signals are conducted to the object locator 42 along path 46 to input 44. The GPS system 50 is of a conventional design well known in the art, illustratively described in U.S. Pat. No. 5,726,660 issued Mar. 10, 1998 to Purdy, et al. and entitled PERSONAL DATA COLLECTION AND RECORDING SYSTEM, which patent is hereby incorporated by reference herein in its entirety. Alternatively, location information signals may be received from the Glasnost Satellite System by the use of a receiving system configured for such reception.

In operation, object locator 42 is intended to be carried or attached to an individual, an object or an animal to be located or tracked by the object locator system 11 of the present disclosure. A user enters the system from the base station, for example, 18 by dialing the telephone number address corresponding to the object locator 42. The object locator 42 functions as a receiver for receiving requests or instructions along wireless link 23 or as a transmitter of location information along wireless link 21 to the base station 18. As described hereinabove, the telephone number may be dialed on telephone set 24 or telephone set 25. The DTMF signal generated by the telephone set 24 or 25 is coupled by path 22 to input 20 of base station 18. At the base station 18 the DTMF request signal is converted to a wireless signal and transmitted from antenna 15 along transmit path 23 to the antenna 36 coupled to object locator 42 along cable 38. The object locator 42 processes the request for location information transmitted by base station 18, obtains location information from the global positioning satellite system 50 and transmits a response containing the location information from antenna 36 along path 21 to the antenna 15 coupled to base station 18 for processing and display on display 30. Alternatively, in some applications, specific structural components of a standard telephone channel, adapted for the purpose, may be substituted for the wireless paths 21 and 23, along with antenna 15 and antenna 36 and their related structures.

Figure 12A:
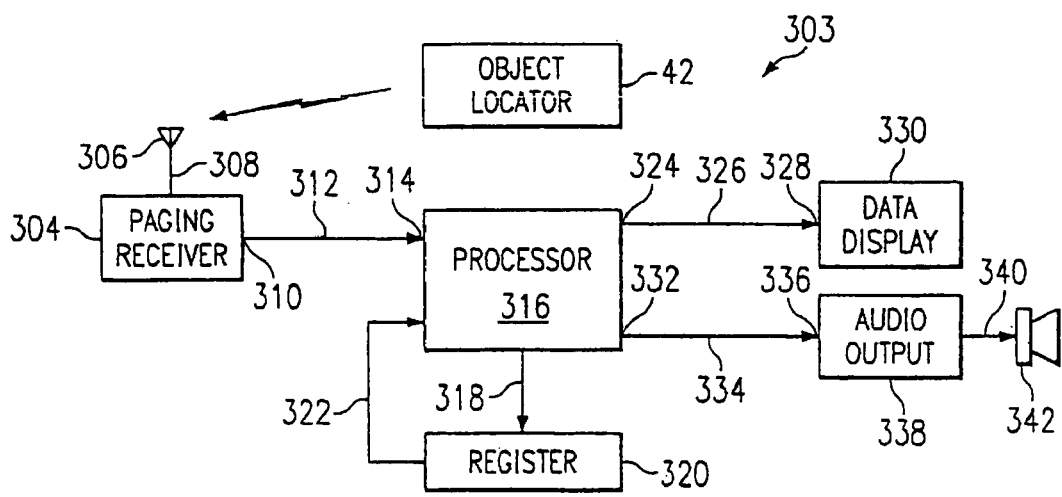
FIG. 12a illustrates a block diagram of an alternative embodiment of a base station according to the present disclosure.

Referring now to FIG. 12a, there is illustrated a block diagram of an alternative embodiment of a base station 303 including features which may be implemented in the base station 302 of FIG. 8 described hereinabove to process the location information received from the object locator 42. In the embodiment shown in FIG. 12a, the base station 302 includes a paging receiver 304 which has a receiving antenna 306 coupled to the paging receiver 304 by a cable 308. The output of paging receiver 304 is supplied in an output 310 along path 312 to an input 314 of a processor 316 which receives and processes the location information for output or display. In the illustrative example of FIG. 12a, the information is stored via path 318 in a register 320. From register 320, the information may be retrieved via path 322 by the processor 316 for processing prior to being output at terminal 324 along path 326 to the input 328 of a data display 330. In this simple example illustrated by the block diagram of FIG. 12a, the location information is processed for display as data which may be in the form of degrees of longitude and latitude, the names of the closest major street intersections, as indicia of the object locator 42 and the base station 18 or in terms of polar coordinates such as an asimuth heading and a distance between the base station 302 and the object locator 42.

In other embodiments corresponding to FIG. 12a, the location information may be translated or converted into a form for plotting on a map reproduced on display 330.

In still other alternative embodiments, the location information may be translated or converted during the processing operation into voice signals for output as a spoken message via an audio output 338 shown in FIG. 12a. The audio output 338 receives location information translated or converted into voice signals from output 332 along line 334 to input 336 of audio output 338. Audio output 338 may typically be an audio power amplifier for generating an audio signal with sufficient power to drive a loudspeaker, for example. In other embodiments, such audio output 338 may be configured as a line output to drive a voice mail system, a telephone connection or other audio output means. From the audio output 338, in this illustrative example, the voice or audio signal is coupled along line 340 to loud speaker 342 for playback to the user. In addition to voice signals, certain annunciating signals indicative of an alarm condition as described hereinabove may also be coupled along line 334 to audio output 338 for playback by loudspeaker 342 or by an alarm transducer configured for the purpose.

Figure 12B:
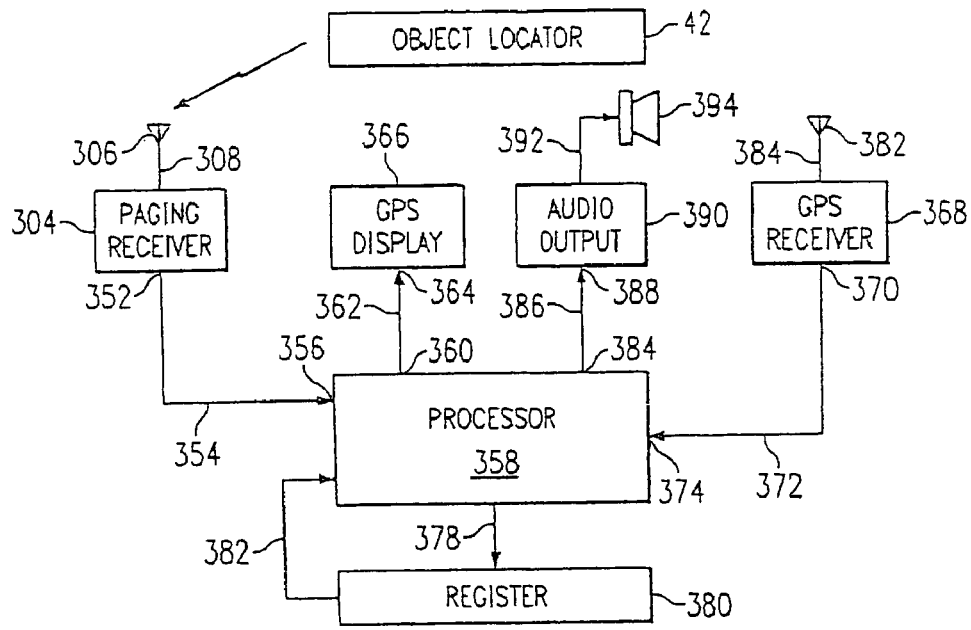
FIG. 12b illustrates a block diagram of another alternative embodiment of a base station according to the present disclosure.

Referring now to FIG. 12b, there is illustrated another alternate embodiment of a base station 351. The base station 351 includes a paging receiver 304. Paging receiver 304 receives location information transmitted by object locator 42 to the antenna 306 of the paging receiver 304 along cable 308. The output of paging receiver 304 is coupled from an output 352 along path 354 to an input 356 of processor 358 in the base station 351. Processor 358 may also have access to a register 380 along path 378 from which the processor 358 may further obtain stored location information along path 382 from register 380. Such location information is, of course, available from the GPS receiver 368 via antenna 396 coupled to GPS receiver 368 along cable 398. The location information then, is coupled at an output 370 from GPS receiver 368 along path 372 to an input 374 to processor 358. This GPS receiver 368 is part of base station 351 and enables the base station 351 to provide an enhanced display of the location information obtained from the object locator 42. This enhanced display, for example, may include the presentation of a map of the region in which the object locator 42 is to be operated.

Continuing with FIG. 12b, there is shown GPS display 366, which is the enhanced display referred to in the preceding paragraph, that obtains data concerning the location coordinates from processor 358 at an output 360 which flows along path 362 to an input to the GPS display 366 at input 364. The GPS display 366 is configured to provide a map of the area that includes both the base station 351 and the object locator 42, and thus may display the relative position of each component of the object locator system 10 with respect to the other. Shown further in FIG. 12b is audio output 390 which is operable to receive voice signals or other audio frequency signals at input 388 via line 386 from output 384 of processor 358, such signals resulting from translation or conversion of the location information during the processing operation in processor 358. Audio output 390 prepares the audio signals for driving loudspeaker 394 via line 392. In addition to voice signals, certain annunciating signals indicative of an alarm condition may also be coupled along line 386 to audio output 390 for playback by loudspeaker 394. Audio output 390 may typically be an audio power amplifier for generating an audio signal with sufficient power to drive a loudspeaker as described hereinabove. In other embodiments such audio output may be configured as a line output to drive a voice mail system, a telephone connection or other audio means.

It will be appreciated that FIGS. 12a and 12b may also implement the object locator system 11 of FIG. 11 merely by substituting some other wireless link for the paging system and paging receiver 304 shown in FIGS. 12a and 12b. As is typical with GPS display units, a map may be shown with streets and thoroughfares indicated thereon and indicia included in a display showing the respective location of the base station 350 and of the object locator 42. Moreover, as described hereinabove, readout statements providing street names, longitude, latitude, azimuth or distance may also be included in the displayed output.

The embodiments described in FIGS. 12a and 12b are intended to be illustrative and not limited to the specific embodiments illustrating the concepts and principles of the present disclosure. Output of location information in the form of alpha-numeric text, spoken messages or map displays may be implemented in any of the several configurations that may be contemplated. Moreover, provision for including several different output structures as illustrated in FIGS. 12a and 12b and for enabling the user to select which output means is desired may also be incorporated in the systems illustrated hereinabove. Certain outputs of location information may be indicated by or accompanied by an alarm instead of or in addition to the selected output. Moreover, when the output is, for example, in a text format or a spoken format, the information provided may be used to manually plot the location coordinates on a geographic map of the area in which the object locator 42 is being used. In yet another embodiment of the present disclosure, the processing of coordinate data produced by the GPS receiver may include translation or conversion of the coordinate data into human readable form by the controller 66 (see FIG. 4) in the object locator 42 prior to the transmission of the location information from the object locator 42 to the base station 18 (see FIG. 1).

Figure 13:
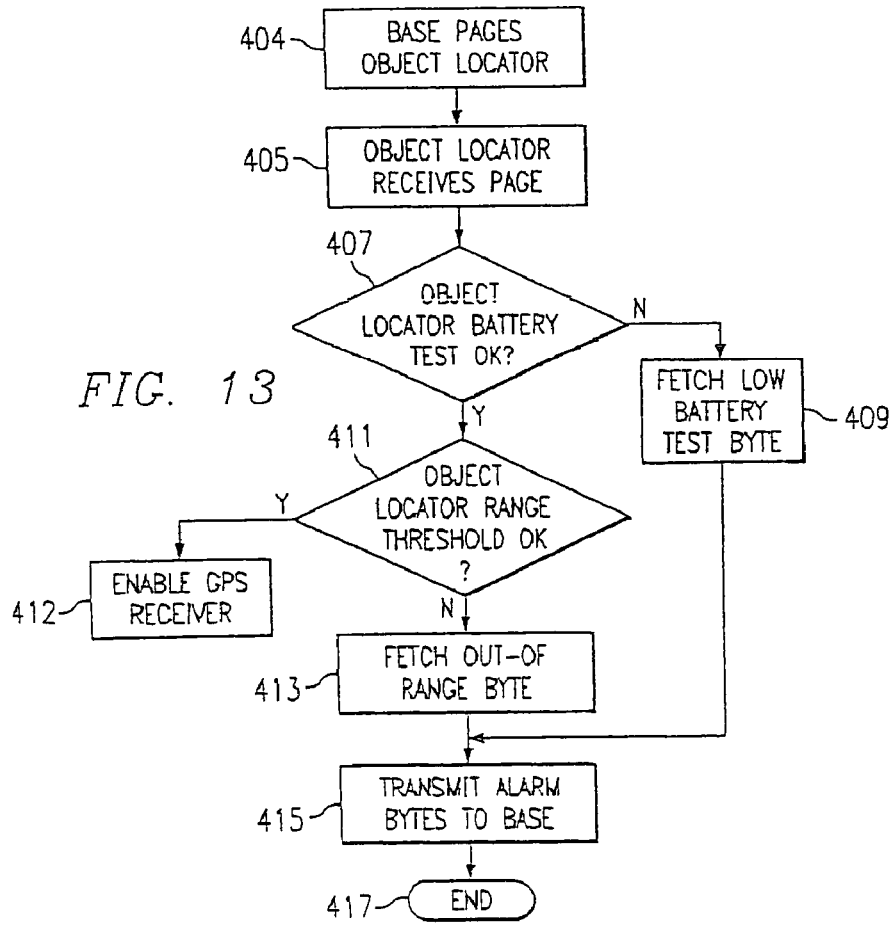
FIG. 13 illustrates an expanded portion of the flowchart of FIG. 10 showing an alternative embodiment of the operation of the object locator system of the present disclosure.

Referring now to FIG. 13, there is shown an expanded portion of a flowchart of the operation of an alternate embodiment to the object locator system 10 illustrated in the flowchart of FIG. 10 and the block diagram of FIG. 4. FIG. 13 illustrates just two cases where the object locator 42 is operable to associate other information related to the operation of the object locator system 10 with the location coordinate information in order to enhance the functionality of the object locator system 10. The examples in FIG. 13 illustrate associating information about battery condition or relation of the object locator to a boundary or a threshold with the location coordinate information that can be transmitted from the object locator 42 to the base station 18. It will be observed by inspection of FIG. 13 that the flow begins at block 404 and continued through block 412 which blocks respectively also appear in FIG. 10 as consecutive blocks in the flowchart following the start block at 402.

Continuing now with FIG. 13, beginning with block 404 where the base station 18 of FIG. 1 (or the base stations of FIGS. 8, 9, 12a and 12b) pages the object locator 42 and the flow thereupon proceeds to block 405 wherein the object locator 42 receives the page from base station 18. Upon the receipt of a page from the base station 18, the object locator in decision block 407 then performs a test of the battery 70 to determine whether or not there is sufficient battery capacity to proceed with the acquisition of location coordinate information from the GPS system 50. If the battery test indicates that sufficient battery capacity exists, then the flow proceeds along the "Y" path to decision block 411 where the object locator 42 performs a second test to determine whether or not a threshold has been traversed. For example, the object locator 42 may be within or beyond a predetermined range established by the strength of a signal being transmitted from the base station 18 or by the receipt of a signal indicating traversal of the boundary of an electronic fence. In the event that the determination made in decision block 411 is affirmative, then the flow proceeds along the "Y" path to block 412 to enable the GPS receiver 78 in the object locator 42. Thereupon the flow proceeds to the steps of the flowchart as illustrated in FIG. 10.

Continuing with FIG. 13, if, however, the battery test performed in decision block 407 in FIG. 13 was negative indicating that the battery 70 has insufficient capacity to perform the complete acquisition of location coordinate information from the GPS system 50, then the flow proceeds along the "N" path to block 409 where the controller 66 (see FIG. 4) in the object locator 42 will proceed to fetch the alarm byte for a low battery to indicate that the battery 70 has insufficient capacity. This low-battery test alarm byte is provided to the transmitter in the object locator 42 and, as shown in block 415, the object locator 42 is operable to transmit this alarm byte to the base station 18. Following the transmission of the alarm byte indicating a low battery test, the flow proceeds from block 415 to block 417 where the routine ends. Returning now to block 411 where the object locator 42 performed a threshold test, if the determination in that test of decision block 411 is in the negative, then the flow proceeds along the "N" path to block 413 where the controller 66 in the object locator 42 fetches the out-of-range alarm byte and sends it to the transmitter to be transmitted in block 415 as an alarm byte to the base station 18. Thereupon the flow proceeds as before to block 417 and the routine ends.

Figure 14:
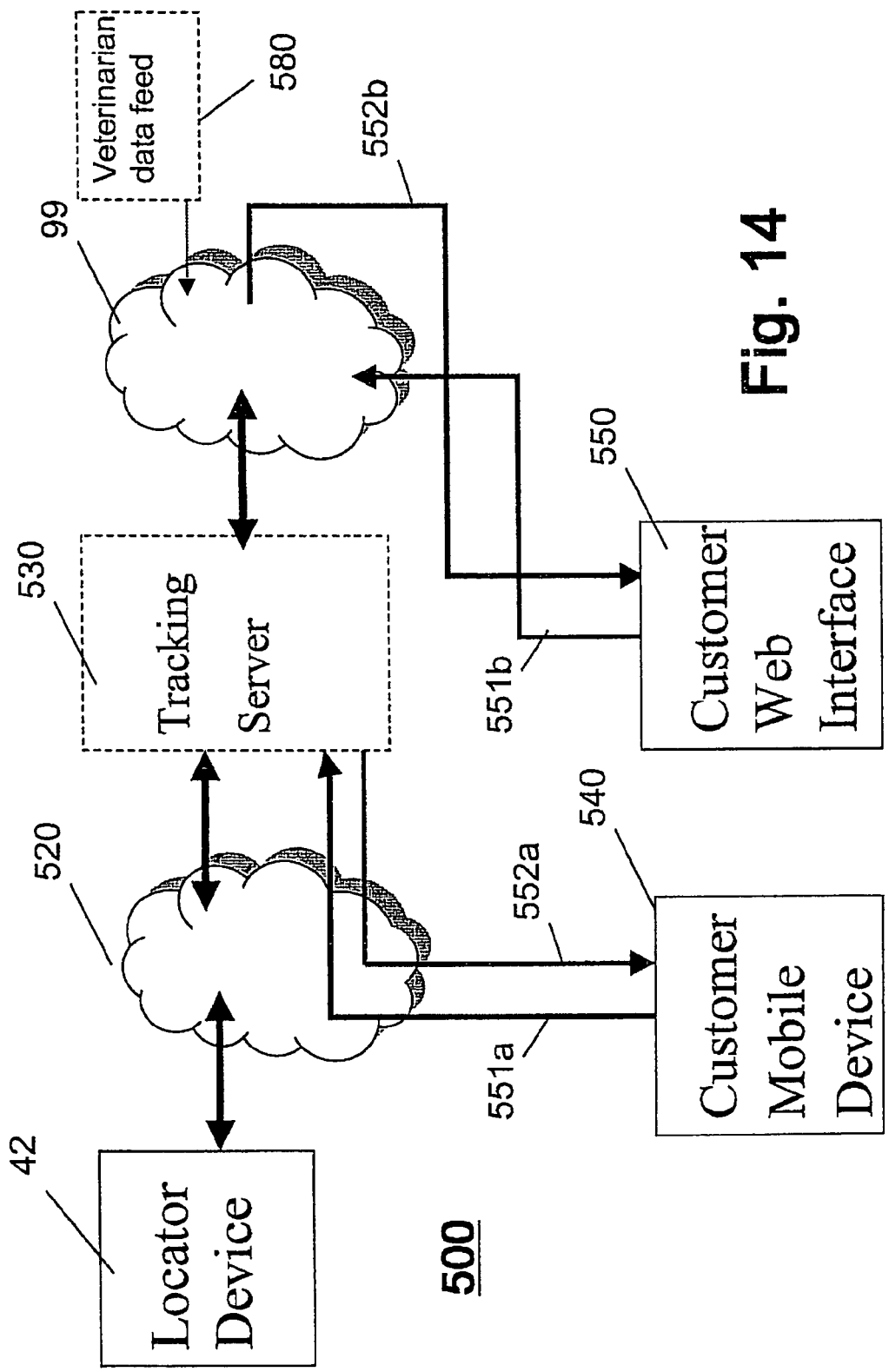
FIG. 14 illustrates one embodiment of a backend system including a customer wireless cellphone interface, customer web interface and tracking server components.

FIG. 14 illustrates an alternative embodiment of a backend infrastructure 500 for an object locator system 11 of the present invention that includes a customer wireless cellphone interface, customer web interface and tracking server components. Particularly, FIG. 14 illustrates an example communications back-end system 500 including the mobile object locator tracking device 42 equipped with cellular phone transceiver for communicating over digital cellular phone network 520. Preferably, the cellular communication system is 3G, i.e., accommodating high-speed multimedia data with speeds ranging from 128 Kbps to several megabits per second. As known, 3G systems are implemented regionally in Europe UMTS (Universal Mobile Telecommunications System), North America (CDMA2000) and Japan (NTT DoCoMo). Via 3G type wireless networks with advanced roaming features, signals may travel anywhere and automatically be handed off to other wireless systems, e.g., inhouse phone system, cellular, satellite, etc. Alternately, or in addition, the cellular phone network implemented may comprise those wireless wide area networks (e.g., WWANs) of the type generally operated by public carriers, and that use open standards such as AMPS (Advanced Mobile Phone System), GSM (Global System for Mobile Communications), GPRS (General Packet Radio Service), CDPD (Cellular Digital Packet Data), TDMA (Time Division Multiple Access), 1xRTT (1x Radio Transmission Technology) and CDMA (Code Division Multiple Access), EDGE, W-CDMA, GSM/UMTS (Universal Mobile Telecommunications System). Such digital cellular phone networks may include those provided by Verizon, Sprint, Cingular, Syniverse, and the like. A tracking server device 530 is provided that receives routine location coordination updates or other monitoring information that the customer may not need or want. The server 530 acts as an intermediary and information store that can be accessed on demand, and as generator of alarms and map information. Via a web browser device 550, the customer may access or initiate communications to the object locator via the Internet 99 and cellular phone network 520, and, while on-line, may receive real-time downloads of mobile locator device positioning coordinates received by the tracking server 530. Alternately, via a customer's cellular phone 540, the customer may access or initiate communications to the object locator via the cellular phone network 520 and tracking server 530, and, receive real-time "over the air" downloads of mobile locator device positioning coordinates. It is understood that communications may comprise user initiated location queries 551a initiated through the respective customer cellular phone 540 which are routed via the cellular phone network 520 to the tracking server for packaging and formatting, and then communicated via the cellular phone network 520 for receipt at the device 42. Likewise, user initiated location queries 551b may be initiated through the respective customer web browser device 550 which are to the tracking server for packaging and formatting, and then communicated via the cellular phone network 520 for receipt at the device 42.

In further embodiments, the invention may implement a short message service (SMS) data services operating over a WLAN (Wireless Local Area Network) for communicating with the mobile object locator that is 3G enabled. This operation may entail formatting a user initiated location query control or like activation message into IP format before delivering to the WLAN. Upon receipt of an SMS message, the mobile object locator will activate the GPS or satellite tracking receiver to obtain its location coordinates.

As described herein, the responses 552a,b from the tracking server may comprise routine location updates, location responses to direct user queries, object locator operational status, strength of transmitted signals, traversal of a threshold, battery condition, alarm signals, and the like. In the case of communicating via the user's web browser device, client connections are those made by subscribers using their personal computer via SSL (Secure Socket Layer) connections.

Figure 15:
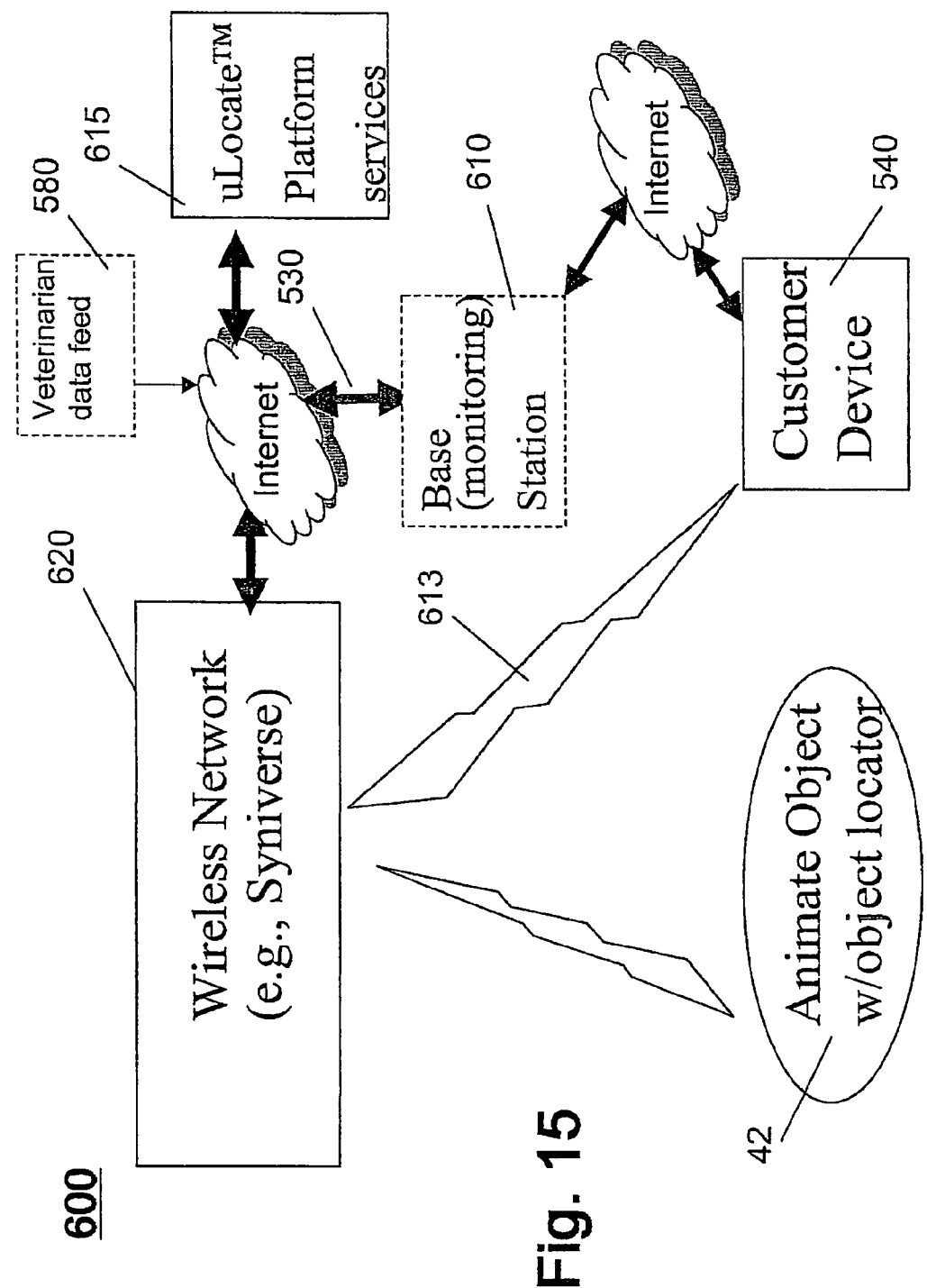
FIG. 15 depicts a further embodiment of a back-end infrastructure 600 that can be used in conjunction with the present invention.

FIG. 15 depicts a further embodiment of a back-end infrastructure 600 that can be used in conjunction with the present invention. In this scenario, a base station 610 comprises a tracking/monitoring service provider, e.g., GlobalPetFinder, Jericho N.Y., that partners with additional party services, e.g., such as the uLocate™ services technology platform 615 that provides infrastructure for setting geofence boundaries and tracking services for the object locator and generating alarms for a variety of user specified devices and modalities, e.g., SMS, MMS. text message, Instant Message, e-mail, browser alerts, etc.

It is understood that, besides the uLocate™ platform services, any location based service technology platform may be integrated, e.g., those that are offered by cell phone networks as a way to send current location and tracking information to mobile or fixed device subscribers. For example, the service provider obtains the location from the GPS receiver chip built into the object locator, or, alternatively, using radiolocation and trilateration based on the signal-strength of the closest cell-phone towers (e.g., for object locator devices without GPS features), may be able to send this information to the LBS services web service, that may provide custom information via the appropriate channel to the inquiring owner's device, e.g., via a website or mobile interface via any one of a myriad of communication modalities. More particularly, as shown in FIG. 15, back-end infrastructure 600 includes a further enhanced wireless network service provider 620, e.g., Syniverse Technologies, providing gateway and data connectivity that enables communication of GPS data and interoperability among mobile, fixed and broadband networks. For instance, in the infrastructure 600, the object locator device 42 whether activated either by remote signal or internally, e.g., when crossing a programmed geo-fence boundary, will obtain its GPS data coordinate fix and provide this data to the Syniverse wireless network service, for example. The GPS location data may be communicated through a gateway to the base station monitoring service provider web server 610. The additional party services, e.g., the uLocate™ LBS platform services, makes a determination of the location and formats an appropriate response message for communication back to a specified user device 540. For example, via the platform for providing GeoFence/Geocoding services, a user is enabled to provide geofencing bondary information and program tracking modes via their web-site. In operation, the platform receives/processes all of the geofencing information and determines when the mobile locator device user or pet has left a programmed geofence boundary. The uLocate™ LBS solution may be implemented to identify the location of object locator, potentially find out what is nearby, and share location with others. By providing Mapping API (application program interfaces) abstraction, uLocate™ services enables the LBS alert messaging via a standard interface across all mobile carriers. Thus, in the embodiment depicted, an alert message may be generated via uLocate services™ and forwarded to the user from the wireless network 620, e.g., Syniverse Technologies, for wireless communication 613 directly to the user's mobile device, e.g., PDA, mobile computer device, cell phone. Alternatively, or in addition, the alert message may be generated and pushed to a user's web-browser having on-line access to the monitoring service web-site (e.g., base station). Thus, the uLocate™ service receives GPS data and makes the determination of exceeding a boundary and initiates alert message generation to notify the user or pet owner of the object locator device's geo-location in a manner relevant to the user. Thus, via the uLocate™ third-party services assist or wireless network, the location of the object locator 42 and potentially other relevant data (map, landmarks, driving directions, tracking history, etc.) may be communicated to a user or pet owner via the service's web-site 610 for display on that user's device.

It is understood that, besides the uLocate™ platform services, any location based services solution may be integrated, e.g., those that are offered by cell phone networks as a way to send current location and tracking information to mobile or fixed device subscribers. For example, the service provider obtains the location from the GPS receiver chip built into the object locator, or, alternatively, using radiolocation and trilateration based on the signal-strength of the closest cell-phone towers (e.g., for object locator devices without GPS features), may be able to send this information to the LBS services web service, that may provide custom information via the appropriate channel to the inquiring owner's device, e.g., via a website or mobile interface via any one of a myriad of communication modalities.

Figure 16:
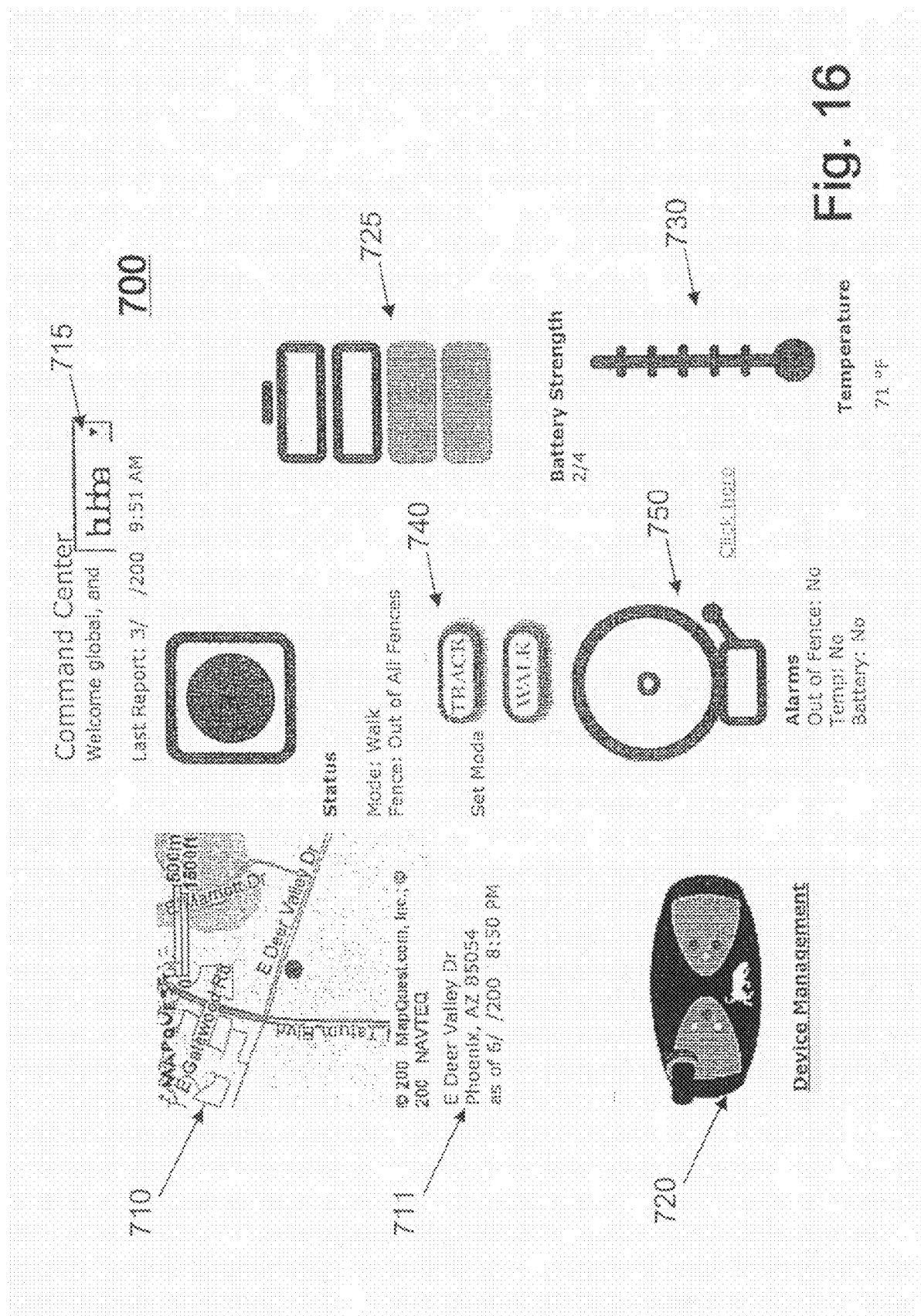
FIG. 16 depicts an example web interface display presented to a subscriber device that shows various features accessible via the base station.

FIG. 16 depicts an example web interface display 700 for a user device that shows various features accessible via the base station. As shown in FIG. 16, a subscribing user device interface includes: the name of the owner's pet or object being tracked 715; a map 710 showing last known location of the pet or human being tracked including last known address and time stamp 711; a device management feature 720 enabling subscribers to set up the tracking configuration; a battery status indicator 725 for indicating the remaining strength of the object locator power supply; an indication 730 of the current temperature reading associated with the object locator device; mode setting buttons 740 enabling user programming of walk mode or tracking mode functionality; and, alarm condition indicator 750 for indicating whether any alarms have been issued for the object location, e.g., out of fence alarm, battery alarm, or temperature alarm, e.g., which will issue when the temperature of the mobile device or its ambient surroundings exceeds or drops below a certain threshold.

Figure 17:
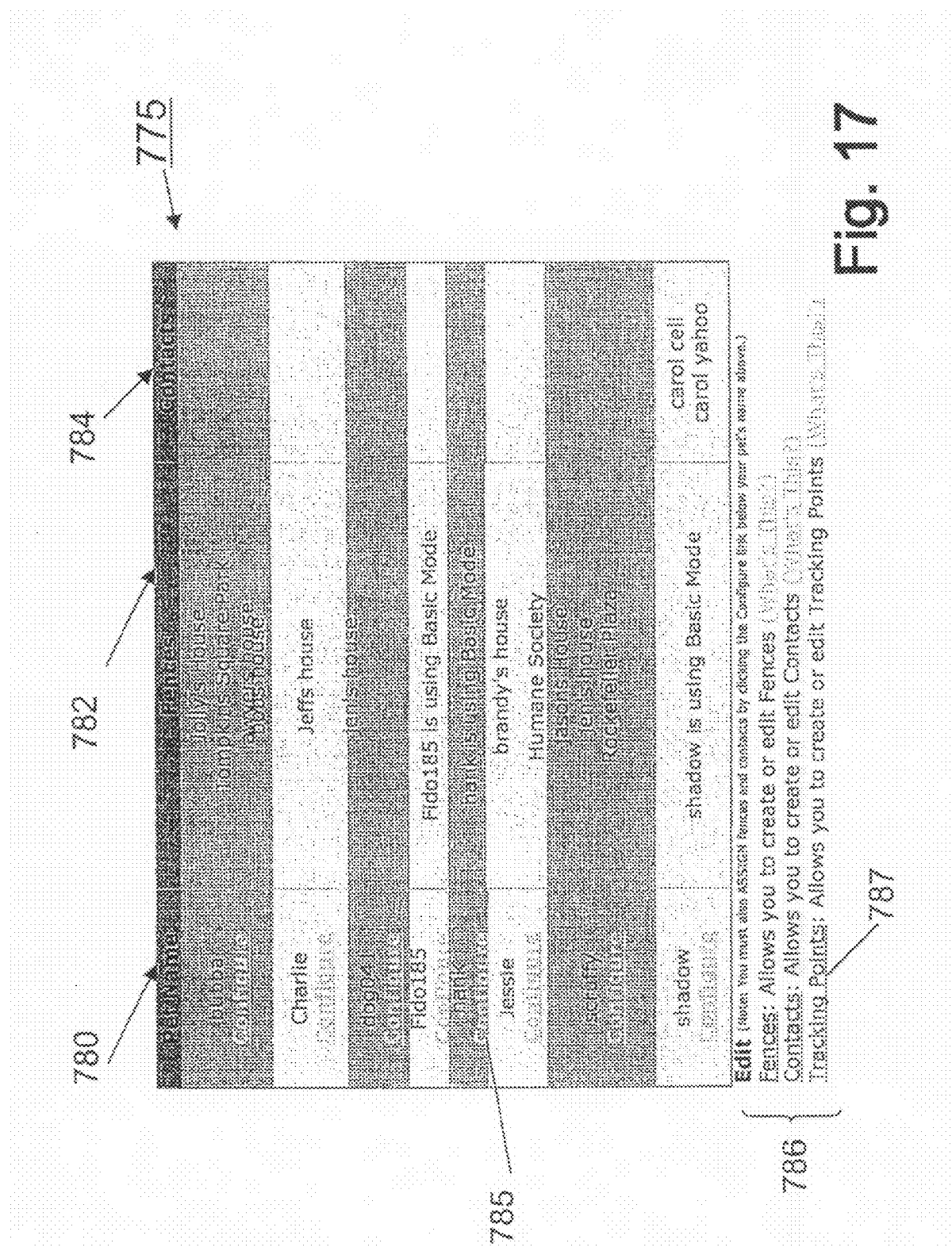
FIG. 17 depicts an example web interface display that enables subscribers to set up the tracking/geo-fence monitoring and alarm configurations via their fixed or mobile web browser device in accordance with one embodiment of the present invention.

Illustrative of the device management functionality accessible via a subscriber, when a user selects the device management feature 720 via the interface 700 depicted in FIG. 16, a further display 775 is generated as shown in FIG. 17 which enables subscribers to set up the tracking/geo-fence monitoring and alarm configurations via their fixed or mobile web browser device. As shown in FIG. 17, the user is presented with the names of the pet or human being tracked in a first column 780, the current geo-fence boundary programmed for the object locator device in corresponding column 782; and, a contact, who is designated to receive an alarm notification for that pet in corresponding column 784. As shown in FIG. 17, it is understood that there may be multiple pets associated with the subscriber account and further, that there may be multiple ways of delivering tracked pet location information.

Figure 18:
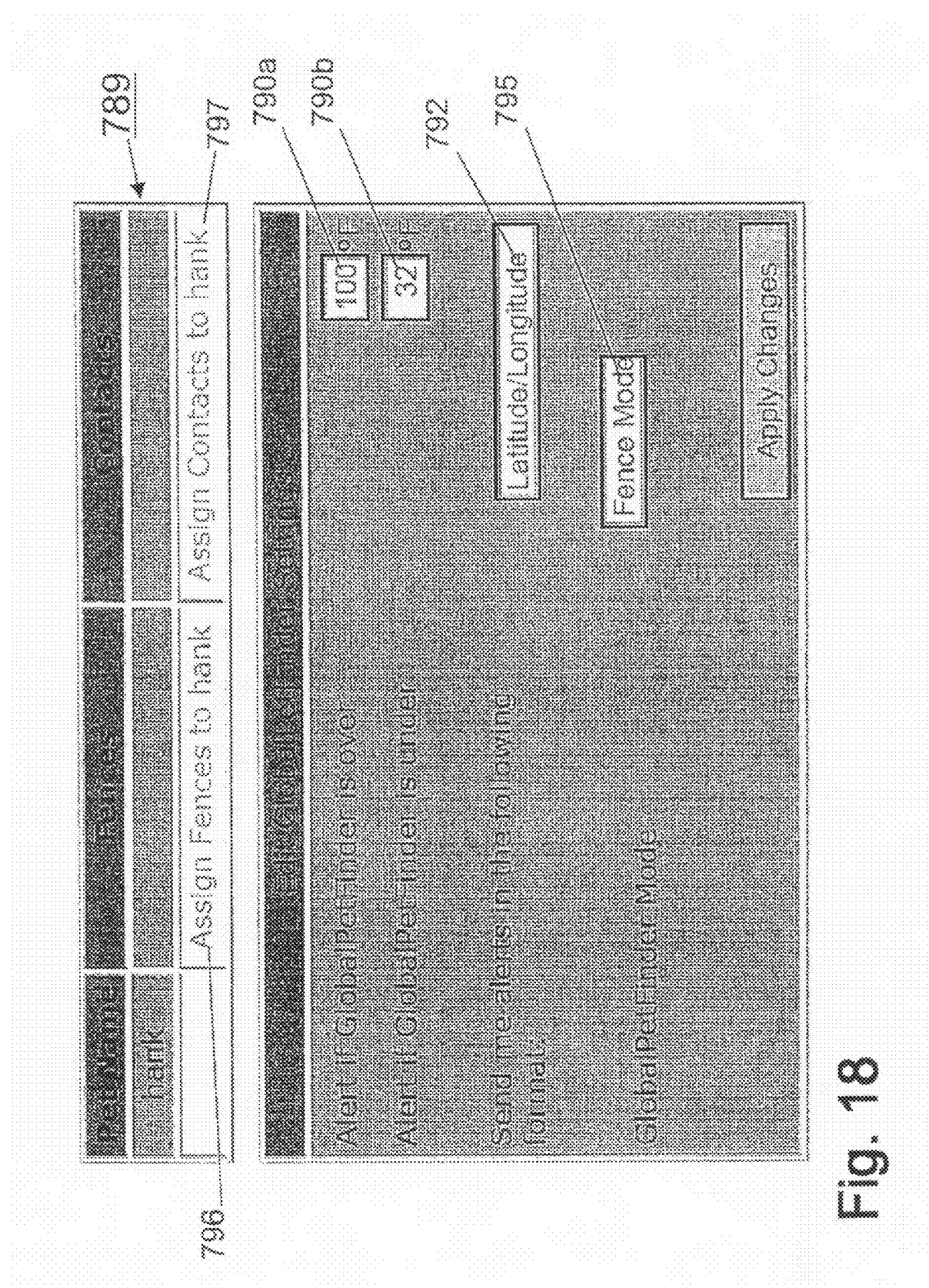
FIG. 18 shows an example screen display interface providing functionality for setting alarms in accordance with one embodiment of the present invention.

For a particular pet, a user may program alarm settings by selecting the configure link 785 for that pet, e.g., "Hank", as shown in FIG. 17. Upon selection of the configure link 785, a further screen display 789 is generated providing functionality for setting alarms as shown in FIG. 18. For example, as shown in FIG. 18, alarm settings for temperature conditions may be set, for example, an upper temperature degree limit 790*a*, and a lower temperature degree limit 790*b*. Furthermore, the user may indicate a preferred manner in which to provide the information for locating a missing pet or human location. For example, as shown in the field 792, a user may indicate reporting in latitude or longitude coordinates, or, a specific address, or, distance and direction reporting modes. The entry field 795 shown in the interface sets the monitoring mode of operation, e.g., a basic mode, where a user may asynchronously demand a location by dialing in a predetermined number on that subscriber's cell phone to obtain the location coordinates of the missing pet or human. Alternately, the user may set a "fence" mode of operation enabling the subscriber to set a geo-fence of virtually any size and initiate tracking functionality so that subscriber may be alerted as soon as their pet has left that fence boundary. Further links 786 are shown in FIG. 17 that when selected will enable user's to edit the programmed geo-fences for a pet, e.g., change the radius, or, edit the contact information for the subscriber. One link 787 in particular, is dedicated to specifying a tracking point that enables a subscriber to set one location as a reference point from which the back-end system may direct the subscriber to his/her you to your pet. In one embodiment, the object locator system will first try and find an address to direct the subscriber you to, and, if it cannot, the subscriber will receive the pet's location in the form of Distance and Direction from the specified Tracking Point. For example, if the user sets a Tracking Point in front of that user's house, and that subscriber's pet runs away down the block where there are no street addresses, the subscriber will receive alerts in the format of "Fido has left and is 50 feet west of Home", for example, where "Home" is the name that subscriber assigned to that Tracking Point.

Figure 19:
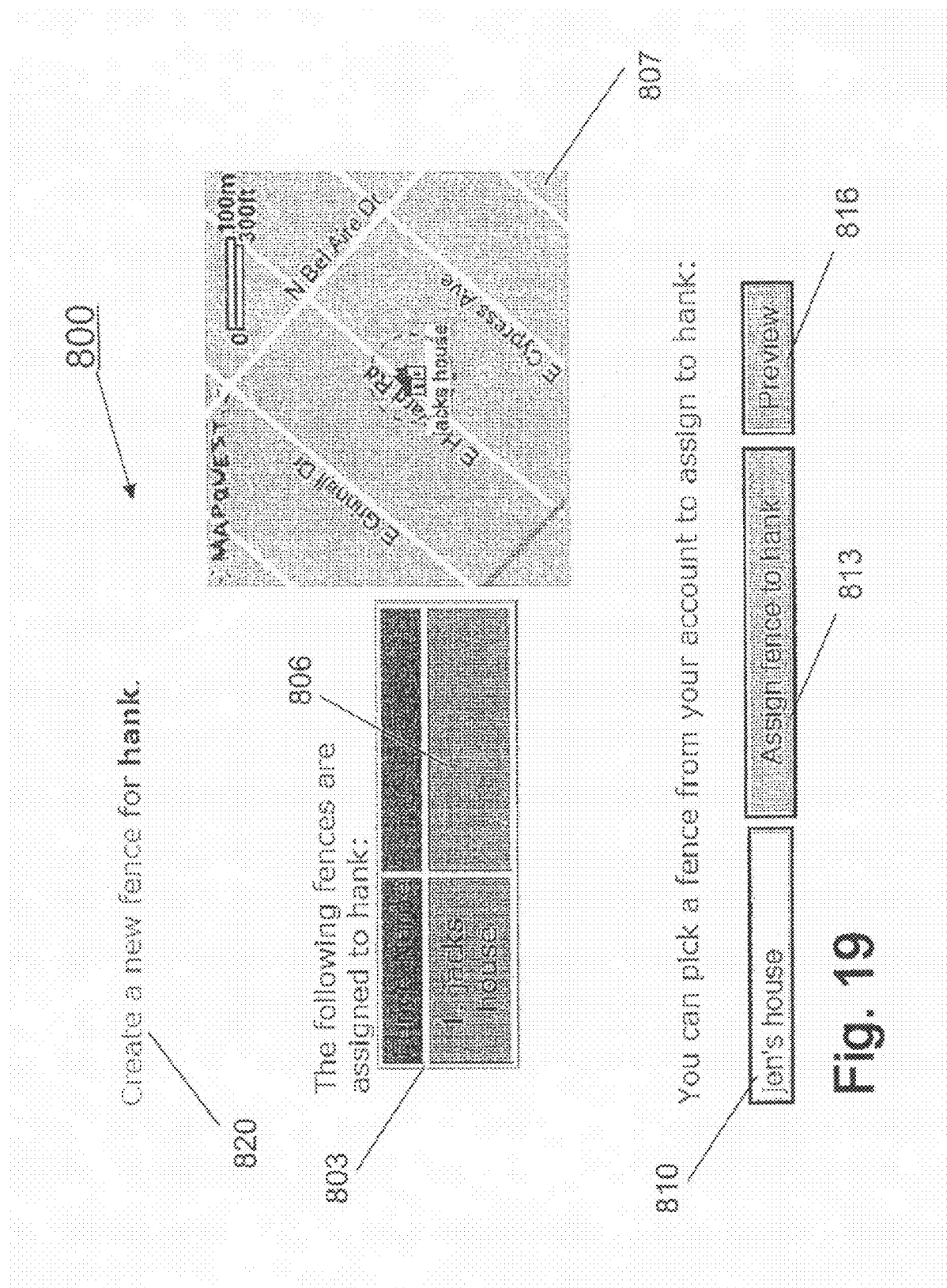
FIG. 19 depicts an interface to provide current fence assignment information and enabling a subscriber to configure a fence in accordance with one embodiment of the present invention.

Particularly, via the device management screen interface 789 depicted in FIG. 19, the subscriber is provided with current fence assignment information 803 for that pet that are stored in the base station of the back-end system. The subscriber may select a preview button 806 which causes generation and display of a pictorial map 807 of the fence boundary for the subscriber's pet indicated. Alternately, or in addition, the subscriber may assign any previous configured fence for the pet by selecting the name of the fence 810 ("Jen's house") as previously specified upon creation of the fence, and indicating assignment to the current pet by selecting the "Assign Fence" to pet button 813, e.g., for assignment to the pet "Hank". Selecting a preview button 816 will enable a viewing of the pictorial map display for that assigned fence ("Jen's house") (not shown).

Figure 20A:
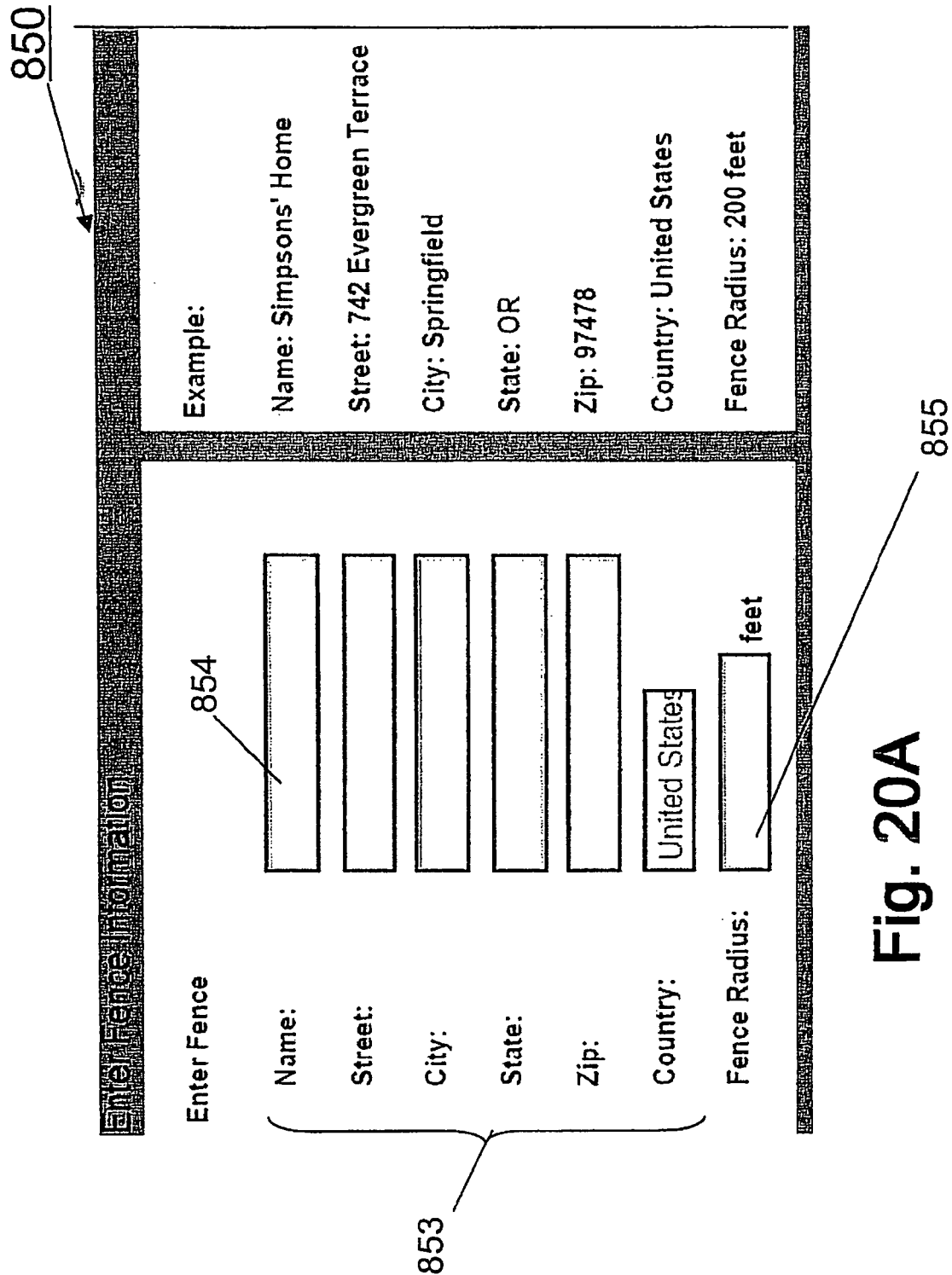
FIGS. 20A-20C depict example screen interfaces that that will enable a user to specify a fence boundary, preview it, and modify its location, respectively in accordance with one embodiment of the present invention.
Figure 20B:
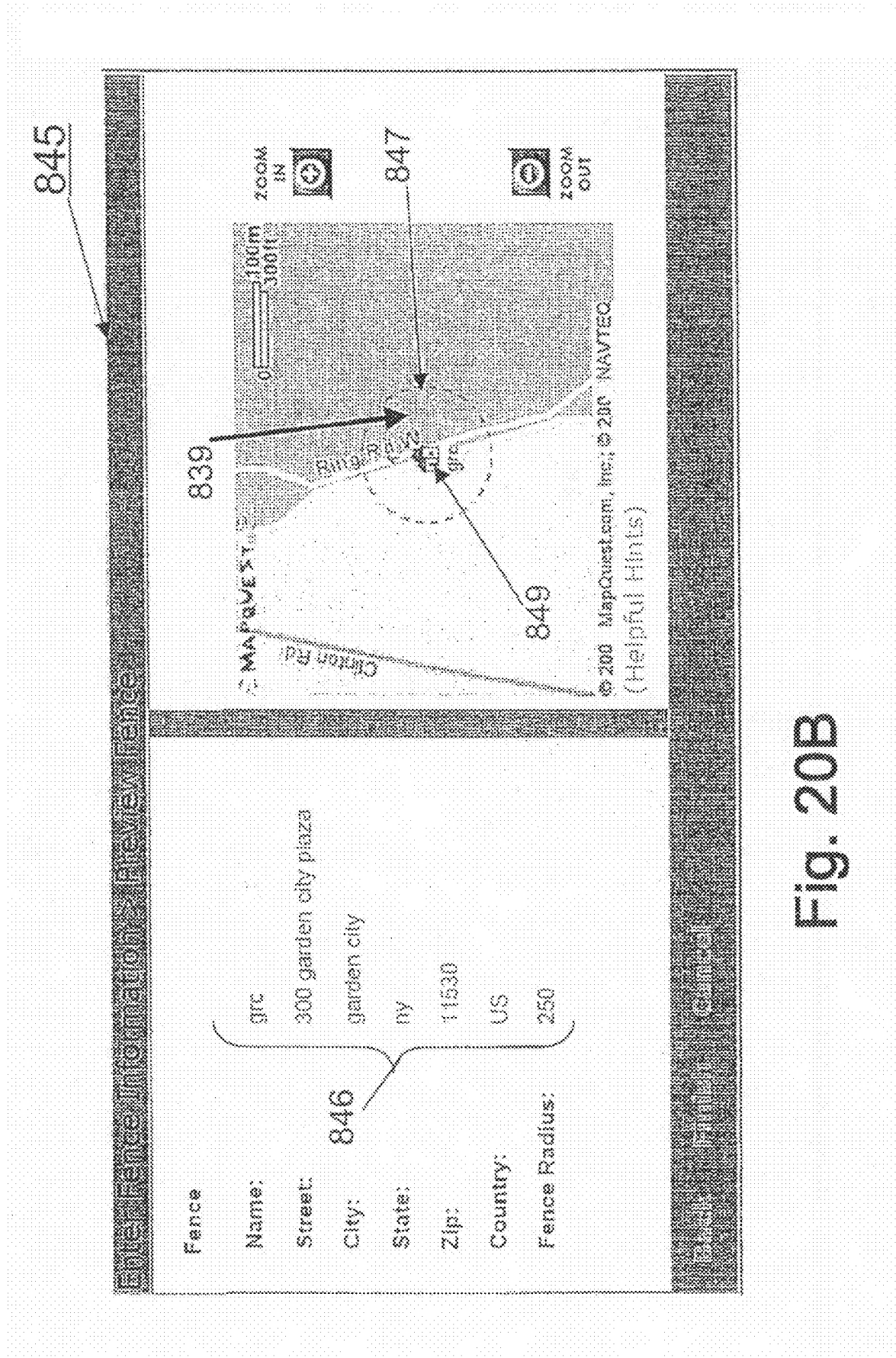
Figure 20C:
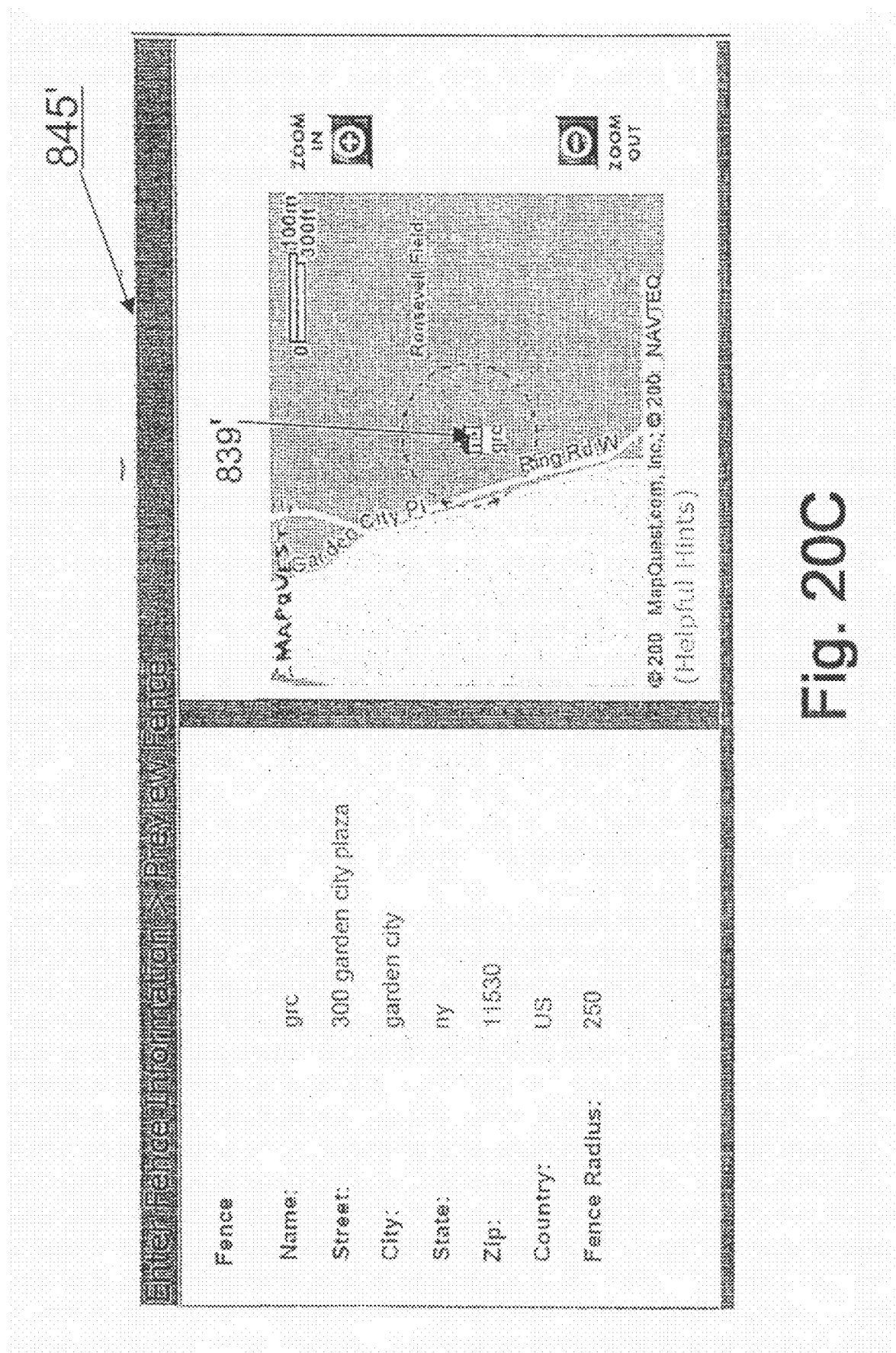

Further, via the screen interface 789 depicted in FIG. 19, the subscriber is provided with a link 820 for creating a new fence for an indicated pet, e.g., the pet "Hank". That is, in response to selecting link 820, an interface display 850 is presented as shown in FIG. 20A, that will enable a user to specify a fence boundary. Entry field 853 enables a user to specify an origin of the area to be encircled with a fence, an includes an entry field 854 for naming the particular fence boundary, e.g., "Simpson's home". Entry field 855 enables the subscriber to enter a radius of a fence boundary, that encircles the origin comprising the indicated address. As shown in FIG. 20B, after entering information 846 including an origin (address) and a radius (geo-fence boundary) to create the fence, there is displayed a preview 845 showing the geo-fence boundary 847 encircling the origin address 849 represented by an icon on the display. In one embodiment, if a user enters an address to create a fence, the back-end system places the center of the house directly on the street, and the subscriber's house may in reality be set back off the street or positioned more toward the back of the property. The system enables the subscriber to perform an adjustment via the user interface presented in FIG. 20B. For example, as shown in FIG. 20B, a user may move the fence by clicking a location, e.g., location 839, within the preview screen 845 where the subscriber desires the new center of the fence to be. That is, after the system displays the preview of the fence, the user you can manipulate a cursor to click anywhere on the map to re-center the location of the fence. Once this is performed, the fence is created at the new location origin with the preview of the new location 839' origin shown in preview display 845' shown in FIG. 20C corresponding to the location entered via the preview of FIG. 20B. This process may change the actual address to something other than what the subscriber has entered in. However, this change is disregarded as the new address calculated is what the satellite understands to be the proper address of the fence that was set.

It is understood that each of the fences created by a subscriber are stored for association with the subscriber's pet.

Figure 21:
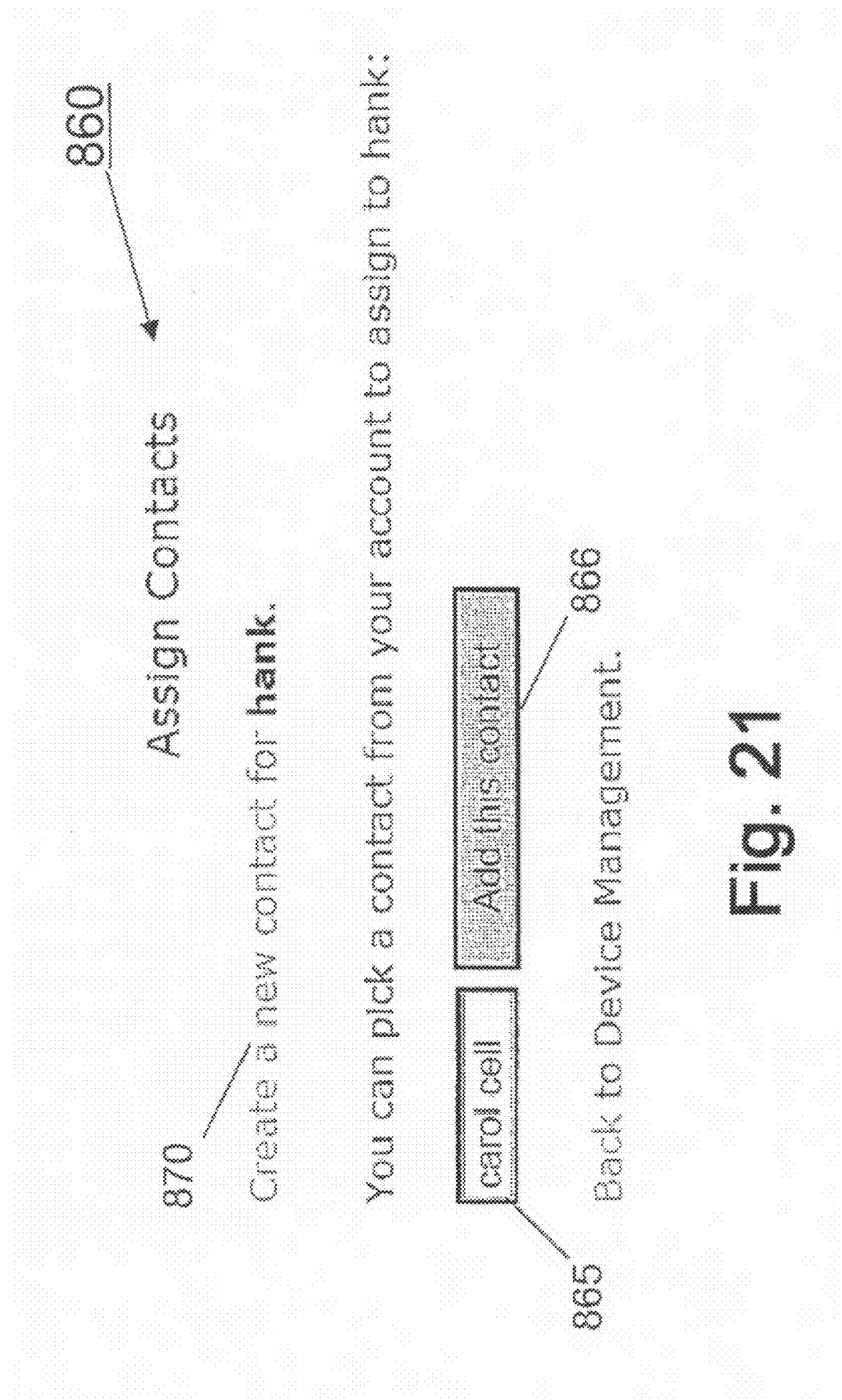
FIG. 21 depicts an example display in which a subscriber may assign a contact for receiving an alarm message in accordance with one embodiment of the present invention.

Referring back to FIG. 17, via the device management screen interface 789, a subscriber may further assign contact information which specifies the contact to whom alarms will be sent and, the messaging modality of the alarm, e.g., SMS, e-mail notice, etc. By selecting "Assign Contacts" button 797, a display is presented to the subscriber that enables the assignment of contact information for the pet (or human). FIG. 21 depicts an example display 860 in which a subscriber may assign a contact for receiving an alarm message. As shown in FIG. 21, a first drop down list 865 is provided that enables the subscriber to scroll through a list of contacts that the subscriber has created and select one or more contacts by selecting the add button 866. Further, via the screen interface 860 depicted in FIG. 21, the subscriber is provided with a link 870 for creating a new contact for an indicated pet, e.g., the pet "Hank". That is, in response to selecting link 870, an interface display 880 is presented as shown in FIG. 22, that will enable a user to specify a contact. Via interface display 880, a user may enter a contact name via entry field 885, specify a preferred communication mode for being contacted, e.g., cellphone or e-mail, via entry field 887, and, further enables specification of an e-mail address of the new contact if the e-mail contact mode is specified. In one embodiment, the contact must ensure that the cell phone specified as a contact recipient device includes SMS text messaging capability.

In a further embodiment of the invention, as depicted in FIGS. 14 and 15, the back-end infrastructure may comprise an optional interface with a veterinarian who may track and monitor and maintain health records of subscriber's pets. Thus, the back-end system may receive a data feed 580 from the veterinarian, that a particular pet needs a "shot" or a teeth check-up, for example. In response to receiving such a notification from data feed 580, the back-end system may generate an alarm to a subscriber that his/her pet needs a particular type of medicine shot and/or a visit to the vet to ensure continued good health. For instance, a subscriber may receive a notification that the pet needs a shot, and an e-mail or IM message will be immediately generated for dispatch to a designated contact via that contact's device. With the integration of veterinarian information into the back-end system in the manner depicted in FIGS. 14 and 15, it is ensured that subscriber may receive critical information regarding the health of their pet. Further to this embodiment, medical records of the pet may stored in memory of the object locator device, and displayable. Thus, if a pet is found by a non-owner, at least the important medical data pertaining to that found pet may be retrieved.

Although the preferred embodiment has been described in detail, it should be understood that various changes, substitutions and alterations can be made therein without departing from the spirit and scope of the invention as defined by the appended claims.

What is claimed is:

1. A method comprising:
   wirelessly receiving location signals at a device coupled to a person;
   activating at least a portion of the device to process location signals for determining location information;
   automatically deactivating the portion of the device after determining the location information;
   identifying a location threshold associated with the person;
   determining a violation of the location threshold based, at least in part, on the location information, wherein the violation is determined by the device coupled to the person.

2. A system comprising:
   a memory operable to store a location threshold associated with person;
   one or more processors operable to:
   wirelessly receive location signals at a device;
   activate at least a portion of the device to process location signals for determining location information;
   automatically deactivate the portion of the device after determining the location information;
   identify the location threshold associated with the person; and
   determine a violation of the location threshold based, at least in part, on the location information, wherein the system is operable to be coupled to the person.

3. A mobile communication unit for locating or tracking a person and operable in a system including a wireless communication network and a base station, comprising:
   a receiver operable to receive data transmissions from a satellite navigation system responsive to an activation signal provided at select intervals in time;
   a transmitter operable to transmit processed location data via said wireless communication network to a user at said base station; and
   a controller operatively coupled to said receiver and said transmitter operable to provide said activation signal to control said receiver, the controller operable to process said data transmissions received from said satellite navigation system and to couple said processed location data to said transmitter for communication of said processed location data from said transmitter to said user at said base station wherein said mobile communication unit is configured for carrying by said person.

4. A method for providing information about a location of person to a user at a base station, wherein a mobile control device carried by the person and coupled with a satellite navigation receiver and a transmitter in communication via a wireless communication network with the base station is operable to obtain location information from the satellite navigation receiver according to the steps of:
   activating the satellite navigation receiver responsive to an activation signal generated in the mobile control device at a predetermined time to acquire the location information from satellite transmissions of a satellite navigation system;
   processing the location information output from the satellite navigation receiver to said control device for coupling processed location information to the transmitter; and
   transmitting the processed location information from the transmitter to the base station via the wireless communication network to communicate the information about the location of the person carrying the control device.

5. A mobile communication unit (MCU) for locating or tracking person, comprising:
   a satellite navigation system receiver having a receiver enable input and an output, said receiver coupled to a first antenna for receiving transmissions from a satellite navigation system upon activation at select intervals in time to provide location data from said output;
   a transmitter having a transmit enable input and a data input, said transmitter coupled to a second antenna for communication to a base station when said location data is provided at said data input;
   a controller for generating activation signals at select intervals in time to activate said satellite navigation system receiver and for processing said location data and controlling communication of proposed location data to said base station at select intervals, said controller having a location data input responsive to said output of said satellite navigation system receiver, a transmit data output for providing said processed location data to said data input of said transmitter, a receiver enable output for coupling a receiver enable signal to said receiver enable input of said receiver and a transmit enable output for coupling a transmit signal to said transmit enable input of said transmitter; and
   a carrier for supporting said MCU upon said person.

6. A mobile communication unit (MCU) for locating or tracking a person and operable in a system including a wireless communication network and a base station, comprising:
   satellite receiving means for receiving data transmissions from a satellite navigation system responsive to an activation signal provided at select intervals in time; transmitting means for transmitting processed location data via said wireless communication network to a user at said base station;
   controlling means operatively coupled to said satellite receiving means and said transmitting means for providing said activation signal to control said satellite receiving means,
   processing said data transmissions received from said satellite navigation system and for coupling said processed location data to said transmitting means for communication of said processed location data from said transmitting means to said user at said base station; and
   secondary receiving means in said mobile communication unit for receiving transmissions from said base station via said wireless communication network wherein said mobile communication unit is configured for carrying by said person.

7. A method for locating or tracking a person, comprising the steps of: attaching a mobile communications unit having at least one antenna coupled thereto to the person;
   accessing transmission of a GPS system at the mobile communications unit to obtain location coordinates of the mobile communications unit;
   communicating the location coordinates from the mobile communication unit via a wireless link to a mobile base station;
   determining location coordinates of the mobile base station; and
   determining from the location coordinates of the mobile communications unit and the determined coordinates of the mobile station a relative location of the mobile base station to the mobile communications unit.

8. A method for locating or tracking a person, comprising the steps of:
   receiving transmission of a GPS system at a mobile communications unit to obtain location coordinates of the mobile communications unit, the mobile communications unit having at least one antenna coupled thereto to the person;
   communicating the location coordinates from the mobile communication unit via a wireless link to a mobile base station;
   determining location coordinates of the mobile base station; and
   determining from the location coordinates of the mobile communications unit and the determined coordinates of the mobile station a relative location of the mobile base station to the mobile communications unit.

* * * * *